(12) United States Patent
Chandrasekaran et al.

(10) Patent No.: US 11,146,468 B1
(45) Date of Patent: Oct. 12, 2021

(54) INTELLIGENT EXPORT OF NETWORK INFORMATION

(71) Applicant: Pensando Systems Inc., Milpitas, CA (US)

(72) Inventors: Varagur Chandrasekaran, Fremont, CA (US); Swaminathan Narayanan, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 17/195,458

(22) Filed: Mar. 8, 2021

(51) Int. Cl.
*H04L 12/26* (2006.01)

(52) U.S. Cl.
CPC ............ *H04L 43/062* (2013.01); *H04L 43/02* (2013.01); *H04L 43/06* (2013.01); *H04L 43/065* (2013.01); *H04L 43/0847* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 7,639,613 B1 | 12/2009 | Ghannadian et al. | |
| 9,172,627 B2 | 10/2015 | Kjendal et al. | |
| 9,762,537 B1 * | 9/2017 | Eyada | H04L 45/02 |
| 10,999,149 B2 * | 5/2021 | Rao | H04L 43/026 |
| 2004/0015599 A1 * | 1/2004 | Trinh | H04L 47/50 709/232 |
| 2008/0279111 A1 * | 11/2008 | Atkins | H04L 47/2425 370/252 |
| 2010/0085891 A1 * | 4/2010 | Kind | H04L 63/1425 370/253 |
| 2013/0003554 A1 * | 1/2013 | Aybay | H04L 43/026 370/235 |
| 2013/0010600 A1 * | 1/2013 | Jocha | H04L 43/062 370/236.2 |
| 2013/0021906 A1 * | 1/2013 | Rahman | H04L 41/5019 370/235 |
| 2013/0041934 A1 * | 2/2013 | Annamalaisami | H04L 47/2483 709/203 |
| 2013/0262703 A1 * | 10/2013 | Dong | H04L 43/026 709/247 |
| 2014/0280887 A1 | 9/2014 | Kjendal et al. | |
| 2015/0319057 A1 * | 11/2015 | Jocha | H04L 43/062 370/241.1 |
| 2016/0285771 A1 * | 9/2016 | Kulkarni | H04L 47/215 |

(Continued)

OTHER PUBLICATIONS

Aitken, Paul et al. "NetFlow/IPFIX Various Thoughts", 3rd NMRG Workshop on NetFlow/IPFIX Usage in Network Management, Jul. 201014 pgs.

(Continued)

*Primary Examiner* — Joshua Joo
(74) *Attorney, Agent, or Firm* — Loza & Loza, LLP

(57) ABSTRACT

Methods and systems for exporting network information from an exporter to a collector are disclosed. Embodiments of the present technology may include updating a non-key field of a flow entry in a flow cache that corresponds to a flow, setting a field in a context-bitmap of the flow entry in response to updating the non-key field of the flow entry, identifying an export policy using the context-bitmap, and exporting information related to the flow to a collector according to the export policy.

19 Claims, 18 Drawing Sheets

(56) References Cited

U.S. PATENT DOCUMENTS

| | | | |
|---|---|---|---|
| 2018/0048571 A1* | 2/2018 | Dharmapurikar | H04L 47/125 |
| 2018/0367364 A1* | 12/2018 | Johansson | G06F 11/3495 |
| 2019/0007326 A1* | 1/2019 | Clemm | H04L 41/0893 |
| 2019/0158591 A1 | 5/2019 | Kjendal et al. | |
| 2019/0294249 A1* | 9/2019 | Martin | G06F 3/014 |
| 2020/0099630 A1* | 3/2020 | Stolarchuk | H04L 43/062 |
| 2020/0366578 A1 | 11/2020 | Punj et al. | |

OTHER PUBLICATIONS

Estan, Cristian et al. "Building a Better NetFlow", SIGCOMM'04, Aug. 30-Sep. 3, 2004, Portland, Oregon, USA, 12 pgs.

Hofstede, Rick et al. "Flow Monitoring Explained: From Packet Capture to Data Analysis with NetFlow and IPFIX", Article in IEEE Communications Surveys & Tutorials, Apr. 2014, 30 pgs.

Pekár, Adrián et al. "Adaptive Aggregation of Flow Records", Computing and Informatics, vol. 37, 2018, pp. 142-164.

Claise, B. et al. "Specification of the IP Flow Information Export (IPFIX) Protocol for the Exchange of Flow Information", Request for Comments: 7011, Sep. 2013, 76 pgs.

Trammell, B. et al. "Flow Aggregation for the IP Flow Information Export (IPFIX) Protocol", Request for Comments: 7015, Sep. 2013, 49 pgs.

\* cited by examiner

| Bits 0..15 | Bits 16..31 |
|---|---|
| Version = 0x000a | Message Length = 64 Bytes |
| Export Timestamp = 2020-11-21 21:32:40 ||
| Sequence Number = 0 ||
| Observation Domain ID = 12345678 ||
| Set ID = 2 (Template) | Set Length = 20 Bytes |
| Template ID = 256 | Number Of Fields = 3 |
| Typ = SourceIPv4Address | Field Length = 4 Bytes |
| Typ = DestinationIPv4Address | Field Length = 4 Bytes |
| Typ = PacketDeltaCount | Field Length = 4 Bytes |
| Set ID = 256 (Data Set Using Template 256) | Set Length = 28 Bytes |
| Record 1, Field 1 = 192.168.0.101 ||
| Record 1, Field 2 = 192.168.0.1 ||
| Record 1, Field 3 = 568 Packets ||
| Record 2, Field 1 = 192.168.0.102 ||
| Record 2, Field 2 = 192.168.0.1 ||
| Record 2, Field 3 = 997 Packets ||

FIG. 3B

| Flow key | Export Trigger | Export Rules | Export Rules | Export Rules | Export Rules |
| --- | --- | --- | --- | --- | --- |
| | Flow Cache Entry Expiration | When | What (E.G., Template ID) | Where/Who (E.g., Collector) | How (TCP, UDP, SCTP) |
| 5-Tuple | Active Timeout Idle Timeout Resource Constraint Natural Expiration Emergency Expiration Flow Cache flush | Immediately Upon Expiration | Tempate ID=Standard (Source IP, Dest IP, Packet Count) | Collector X | TCP |

FIG. 5

| | Security Context Fields | Performance Context Fields | Latency Context Fields | Error Context Fields | Raw-Stats-Context Fields | ... | Context-Bitmap Field |
|---|---|---|---|---|---|---|---|
| 5-Tuple Flow-key Fields | Security Context Fields | Performance Context Fields | Latency Context Fields | Error Context Fields | Raw-Stats-Context Fields | ... | Context-Bitmap Field |
| 4-Tuple Flow-key Fields | Security Context Fields | Performance Context Fields | Latency Context Fields | Error-Data Context Fields | Raw-Stats-Data Context Fields | ... | Context-Bitmap Field |
| 3-Tuple Flow-key Fields | Security-Data Context Fields | Performance Data Context Fields | Latency-Data Context Fields | Error-Data Context Fields | Raw-Stats-Data Context Fields | ... | Context-Bitmap Field |
| 2-Tuple Flow-key Fields | Security-Data Context Fields | Performance Data Context Fields | Latency-Data Context Fields | Error-Data Context Fields | Raw-Stats-Data Context Fields | ... | Context-Bitmap Field |
| 1-Tuple Flow-key Fields | Security-Data Context Fields | Performance Data Context Fields | Latency-Data Context Fields | Error-Data Context Fields | Raw-Stats-Data Context Fields | ... | Context-Bitmap Field |
| Tx/Rx Direction Fields | Security-Data Context Fields | Performance Data Context Fields | Latency-Data Context Fields | Error-Data Context Fields | Raw-Stats-Data Context Fields | ... | Context-Bitmap Field |

FIG. 7

| BIT-15 | BIT-14 | BIT-13 | BIT-12 | BIT-11 | BIT-10 | BIT-9 | BIT-8 | BIT-7 | BIT-6 |
|---|---|---|---|---|---|---|---|---|---|
| TCP Security | TCP Performance | TCP Latency | TCP Error | TCP Raw-Stats | UDP Security | UDP Performance | UDP Error | UDP Raw-Stats | ICMP Security |

| BIT-31 | BIT-30 | BIT-29 | BIT-28 | BIT-27 | BIT-26 | BIT-25 | BIT-24 | BIT-23 | BIT-22 |
|---|---|---|---|---|---|---|---|---|---|
| RSVD-1 | RSVD-2 | Non-IP Security | Non-Ip Performance | Non-Ip Error | Non-Ip Raw-Stats | ARP Security | No Security | Other-L4 Security | Other-L4 Performance |

FIG. 9

INTELLIGENT EXPORT OF NETWORK INFORMATION

BACKGROUND

In a network, such as a cloud or data center network, some packet traffic may be monitored and information related to the monitoring may be exported for further use. For example, IP flows are often monitored using the IP Flow Information eXport (IPFIX) protocol, also referred to simply as "IPFIX." According to IPFIX, IP flow information is metered and exported by an IPFIX exporter and then received and processed by an IPFIX collector. Often times, IPFIX is used to monitor and report packet counts and byte counts on a per-flow basis. In some cloud or data center networks, the IPFIX exporter is integrated into a Network Interface Card (NIC) of a host computing system, sometimes, referred to as a "SmartNIC." Although IPFIX works well to provide IP flow information to a collector, IPFIX is not well suited to take advantage of the expanded capabilities of emerging devices, such as SmartNICs, which are implementing IPFIX exporter functionality.

SUMMARY

Methods and systems for exporting network information from an exporter to a collector are disclosed. Embodiments of the present technology may include updating a non-key field of a flow entry in a flow cache that corresponds to a flow, setting a field in a context-bitmap of the flow entry in response to updating the non-key field of the flow entry, identifying an export policy using the context-bitmap, and exporting information related to the flow to a collector according to the export policy.

In an embodiment, exporting information related to the flow to a collector according to the export policy involves exporting information according to the IPFIX protocol.

In an embodiment, the context-bitmap includes a set of context-specific bits.

In an embodiment, the context-bitmap includes a set of context-specific bits, including a short-lived context bit and a long-lived context bit.

In an embodiment, the context-bitmap includes a set of context-specific bits, including a dormant context bit and an active context bit.

In an embodiment, the context-bitmap includes a set of context-specific bits, including a security bit, a performance bit, a latency bit, an error bit, and a raw statistics bit.

In an embodiment, the context-bitmap includes a set of context-specific bits, including TCP context bits, UDP context bits, and ICMP context bits.

In an embodiment, the context-bitmap includes a set of context-specific bits, including a short-lived context bit, a long-lived context bit, a dormant context bit, an active context bit, a security bit, a performance bit, a latency bit, an error bit, and a raw statistics bit.

In an embodiment, the context-bitmap includes a set of context-specific bits, including a short-lived context bit, a long-lived context bit, a dormant context bit, an active context bit, TCP context bits, UDP context bits, and ICMP context bits.

In an embodiment, identifying an export policy using the context-bitmap involves using the context-bitmap to search an export policy lookup table that maps context-bitmap values to export policies.

In an embodiment, identifying an export policy using the context-bitmap involves using the context-bitmap to search an export policy lookup table that maps context-bitmap values to export policy actions and export policy parameters, wherein the export policy parameters include pointers to a collector template table. In an embodiment, the method further involves identifying a collector and an export template using a pointer from the export policy lookup table.

In an embodiment, the non-key field in the flow cache holds information related to security of the flow and a bit in the context-bitmap includes a security context bit that is set in response to a value of the non-key field.

In an embodiment, the non-key field in the flow cache holds information related to performance of the flow and a bit in the context-bitmap includes a performance context bit that is set in response to a value of the non-key field.

In an embodiment, the non-key field in the flow cache holds information related to latency of the flow and a bit in the context-bitmap includes a latency context bit that is set in response to a value of the non-key field.

In an embodiment, the non-key field in the flow cache holds information related to an error of the flow and a bit in the context-bitmap includes an error context bit that is set in response to a value of the non-key field.

In an embodiment, updating a non-key field of a flow entry in a flow cache involves parsing a packet to identify a key field and using the key field to locate a flow entry in the flow cache.

Another embodiment of a method for exporting network information from an exporter to a collector is disclosed. The method involves updating a non-key field of a flow entry in a flow cache that corresponds to a flow, setting a field in a context-bitmap of the flow entry in response to updating the non-key field of the flow entry, identifying an export policy using the context-bitmap, exporting information related to the flow to a collector according to the export policy, wherein exporting information related to the flow to a collector according to the export policy involves exporting information according to the IPFIX protocol, wherein the non-key field in the flow cache holds information related to the flow and a bit in the context-bitmap includes a context bit that is set in response to a value of the non-key field.

In another embodiment, a system for exporting network information from an exporter to a collector is disclosed. The system includes a processor and a computer readable medium that stored instructions, which when executed by the processor, implement updating a non-key field of a flow entry in a flow cache that corresponds to a flow, setting a field in a context-bitmap of the flow entry in response to updating the non-key field of the flow entry, identifying an export policy using the context-bitmap, and exporting information related to the flow to a collector according to the export policy.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3B depicts a specific example of an IPFIX message in which the template ID is set to 256.

FIG. 5 depicts a table of parameters that correspond to conventional IPFIX export of IP flow information.

FIG. 7 depicts an example of enhanced flow cache entries that are held in a flow cache in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
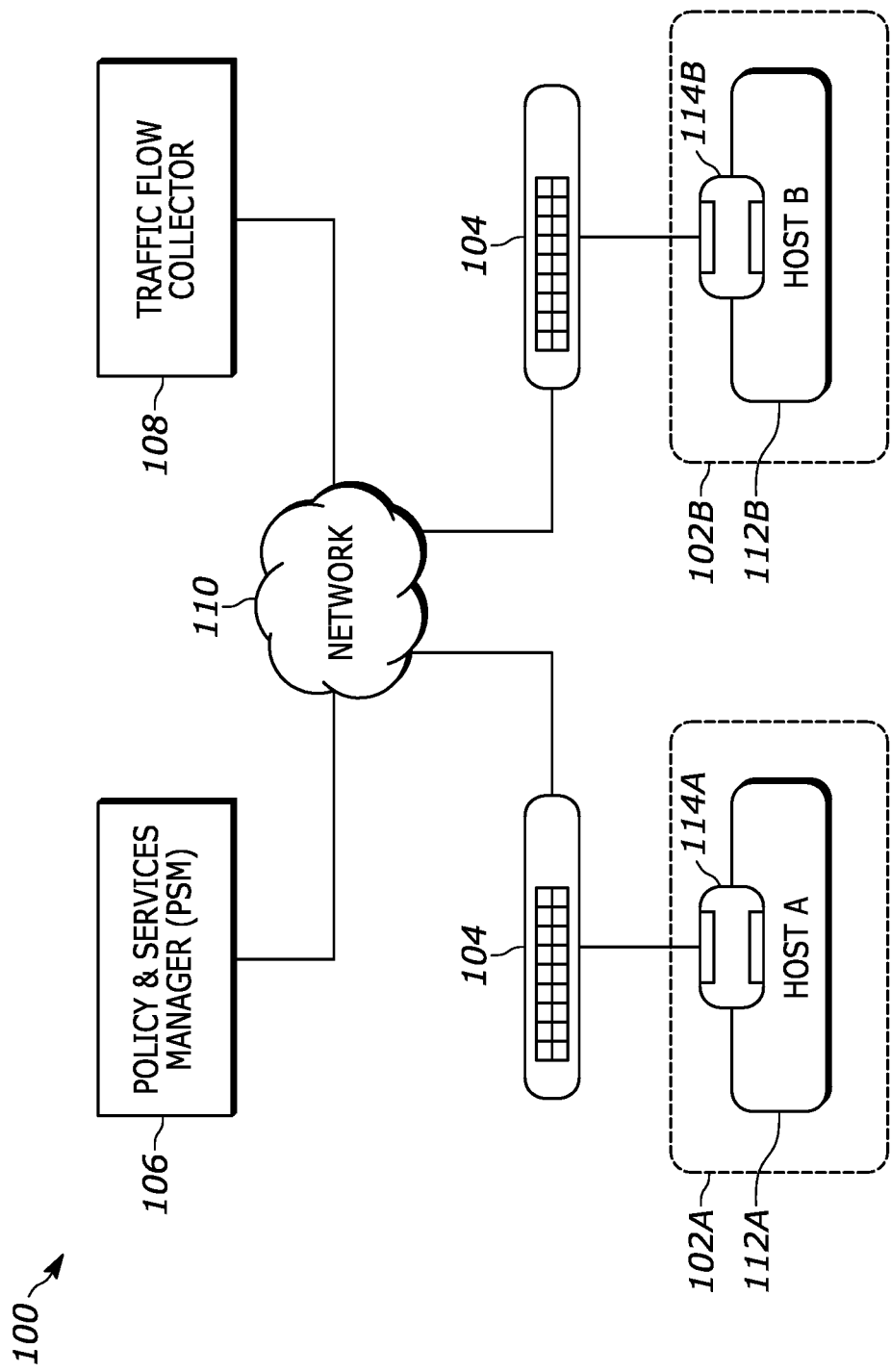
FIG. 1 depicts an example network architecture that includes host computing systems, switches, a Policy and Services Manager (PSM), and a Traffic Flow Collector, which are all connected by a network.

FIG. 1 depicts an example network architecture 100 that includes host computing systems 102A and 102B, switches 104 (e.g., "Top-of-Rack" (ToR) switches), a Policy and Services Manager 106 (PSM), and a Traffic Flow Collector 108, which are all connected by a network 110. In an embodiment, the host computing systems include a host computer 112A and 112B and an edge device 114A and 114B, such as a Network Interface Card (NIC). The host computer may include a storage server, a compute server, a single processor, multiple processors, primarily compute, and/or primarily storage.

In an embodiment, the ToR switches 104 are network switches that are commonly used to connect servers in a data center. In at least one example, at least one switch is placed in a rack of servers and the servers in the rack are connected to the switch by copper wire and/or fiber cables, e.g., Ethernet cables. Although the switches are referred to herein as "ToR" switches, the switches may be deployed relative to host computers (e.g., servers) in other ways. For example, the switches may be "leaf" switches in a deployment that includes "spine" switches and leaf switches. In another example, the ToR switches may be routers or other general intermediate systems forwarding data between hosts in a global area network or other generic network.

In an embodiment, the PSM 106 is a computing system that manages and delivers network and security policy to the edge devices 114A and 114B for services implementation at the edge. The PSM may utilize gRPC and RESTful APIs to communicate with the edge devices. The PSM enables distribution of network management information such as ACL and firewall security policies, network configuration, encryption policies, etc. to active edge devices. In addition, the PSM can distribute network monitoring configurations, such as IPFIX configuration information, to the NICs. Although a PSM is shown in the example of FIG. 1, in other examples, there is not a PSM or there is some other centralized controller.

In an embodiment, the Traffic Flow Collector 108 receives packet traffic information, traffic related telemetry data, and/or other data computed by the NICs from the host computing systems 102A and 102B. The Traffic Flow Collector may be configured to collect and analyze packet traffic and other data received from the host computing systems. In an embodiment, the Traffic Flow Collector is an IPFIX collector. Although the Traffic Flow Collector may support IPFIX, the Traffic Flow Collector may support some other flow information export protocols, such as NetFlow.

In an embodiment, the network architecture 100 is implemented as a data center network (DCN) that interconnects data center resources such as compute and storage servers.

The DCN may utilize various data center architectures, such as, three-tier DCN, fat tree DCN, and DCell. Although in one example, the network architecture is a DCN, the network 110 that connects the host computing systems 102A and 102B, including the edge devices 114A and 114B may be another type of LAN and/or WAN. Although the network architecture shown in FIG. 1 is one example, the technique for exporting network information based on context-directed export rules is applicable to other network architectures.

In some use cases in the network architecture 100 described with reference to FIG. 1, it may be desirable to have the NICs 114A and 114B perform tasks such as IP flow monitoring, which are not directly related to forwarding packet traffic through the network. For example, it may be desirable to have the NICs implement IP flow monitoring according to the IPFIX protocol to export flow related information to the Traffic Flow Collector 108.

Figure 2:
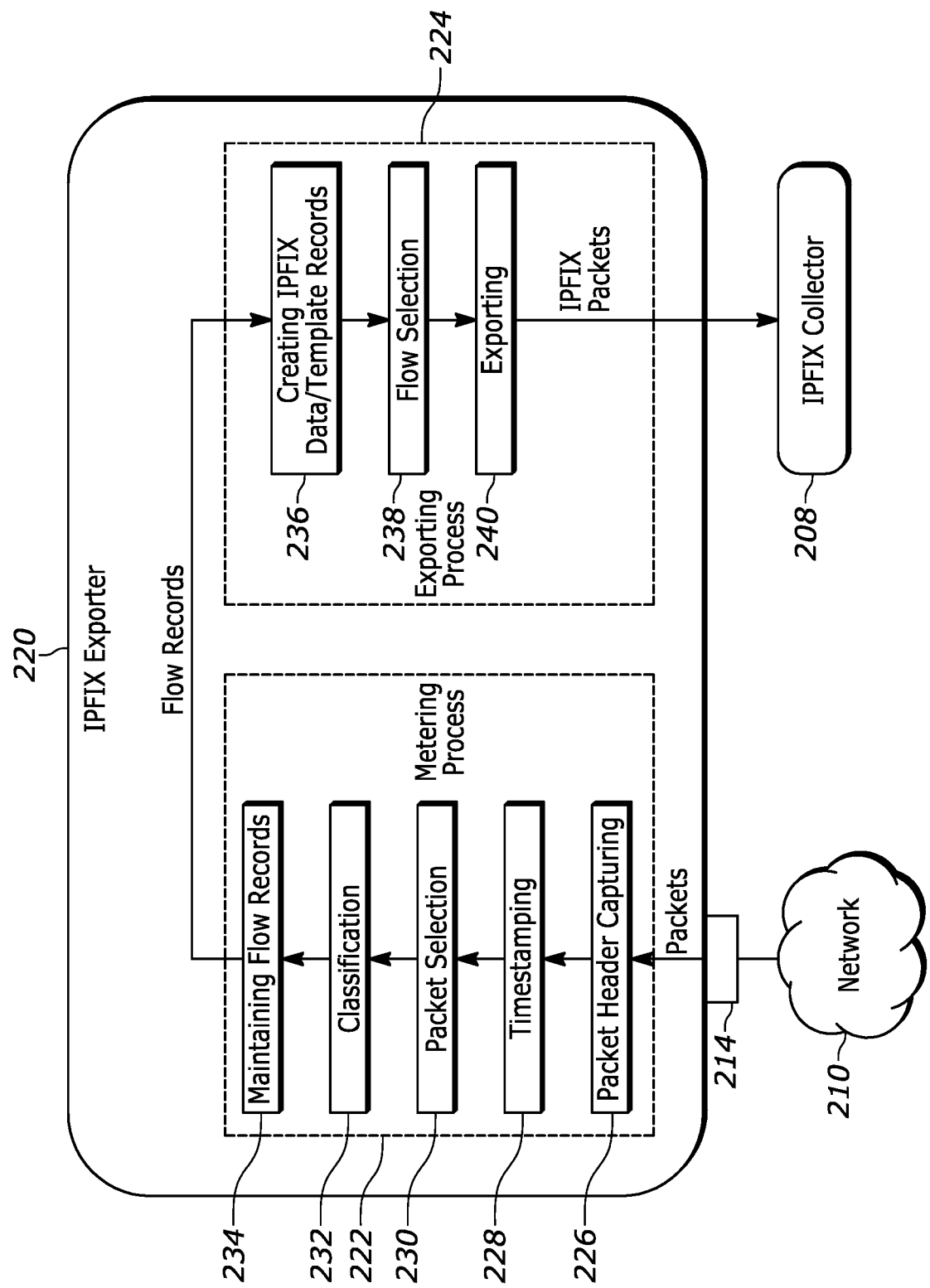
FIG. 2 depicts an example of a functional block diagram of an IPFIX exporter, which may be implemented in, for example, NICs.

FIG. 2 depicts an example of a functional block diagram of an IPFIX exporter 220, which may be implemented in, for example, the NICs 114A and 114B, shown in FIG. 1. The IPFIX exporter is shown relative to a network 210, an observation point 214 (e.g., a SmartNIC), and an IPFIX collector 208. In the example of FIG. 2, the IPFIX exporter includes a metering process functional block 222 and an exporting process functional block 224. Subblocks of the metering process functional block include packet header capturing 226, timestamping 228, packet selection 230, classification 232, and maintaining flow records 234, and subblocks of the exporting process functional block include creating IPFIX data/template records 239, flow selection 238, and exporting 240. Some of the subblocks (e.g., packet header capturing, maintaining flow records, creating IPFIX data/template records, and exporting) may correspond to core functions of the IPFIX exporter while other subblocks (e.g., timestamping, packet selection, classification, and flow selection) may correspond to optional functions of the IPFIX exporter. As illustrated in FIG. 2, packets are input to the metering process functional block, flow records are generated by the metering process functional block, and the flow records are provided to the exporting process functional block. At the exporting process functional block, IPFIX messages are generated and transmitted to the IPFIX collector.

Figure 3A:
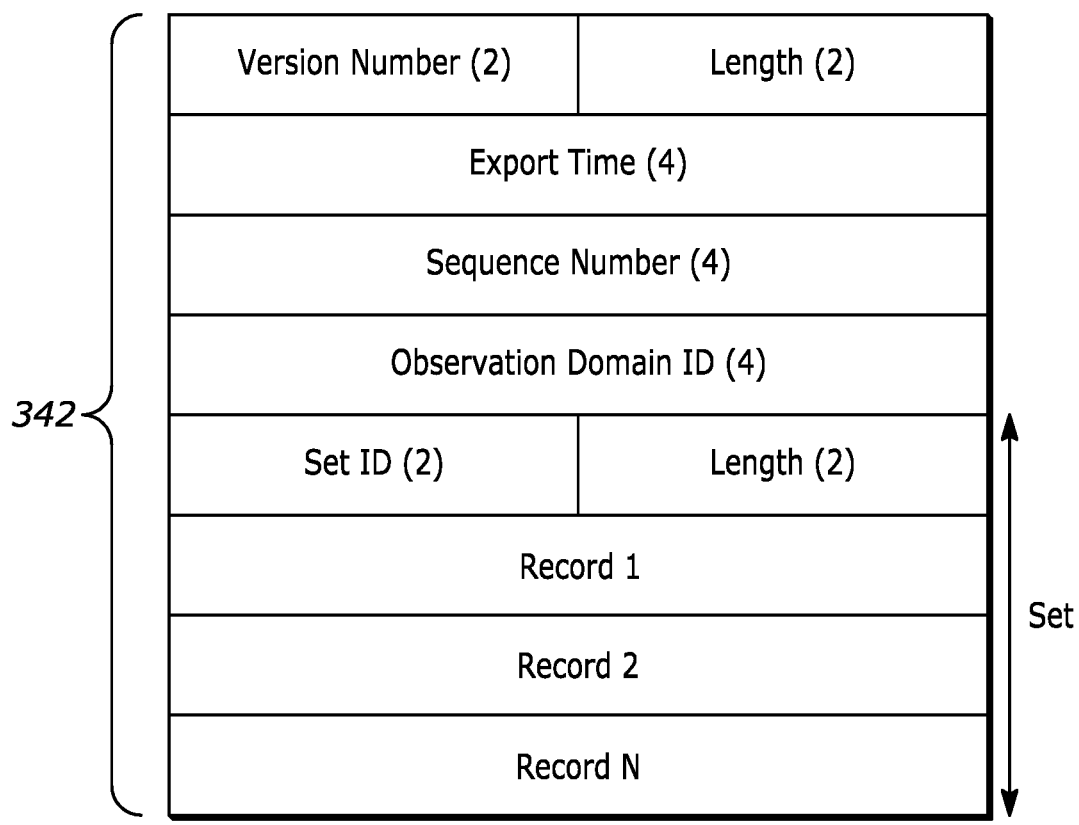
FIG. 3A depicts the frame format of an IPFIX message.

FIG. 3A depicts the frame format of an IPFIX message 342, that is, a message that is formatted according to the IPFIX protocol. The IPFIX message includes the following fields; version number (2-byes), message length (2-byes), export time (4-byes), sequence number (4-byes), observation domain ID (4-byes), and one or more "sets" in which each set includes a set ID (2-byes), length (2-byes), and n records (variable number of bytes). As specified in the IPFIX protocol, the sets may be template sets, data sets, or options template sets. FIG. 3B depicts a specific example of an IPFIX message 342 in which the template ID is set to 256, e.g., template ID=256. In the example of FIG. 3B, the packet count for two different IP flows is reported. In particular, the reported flow information is provided in Table 1 below.

TABLE 1

| Source IP Address | Destination IP Address | Number of Packets |
|---|---|---|
| 192.168.0.101 | 192.168.0.1 | 568 |
| 192.168.0.102 | 192.168.0.1 | 997 |

As shown in FIG. 3B, the information elements (IEs) called out in the template 344 are source IP address (e.g., sourceIPv4Adress), destination IP address (e.g., destinationIPv4Address), and packet count or number of packets (packetDeltaCount). In the records field 346, Record 1, Field 1, identifies the source IP address (e.g., 192.168.0.101), Record 1, Field 2, identifies the destination IP address (e.g., 192.168.0.1), and Record 1, Field 3, identifies the packet count (e.g., 568) of a first IP flow, and Record 2, Field 1, identifies the source IP address (e.g., 192.168.0.102), Record 2, Field 2, identifies the destination IP address (e.g., 192.168.0.1), and Record 2, Field 3, identifies the packet count (e.g., 997) of a second IP flow. It should be understood that FIG. 3B is provided as one example of an IPFIX message, however, other examples are possible.

As part of the metering process, data related to IP flows is stored in a flow cache of the IPFIX exporter on a per flow entry basis. That is, the flow cache stores information about unique flows that are identified at the IPFIX exporter. In an embodiment, a flow cache includes key fields and non-key fields. The key fields are used to define a flow and a flow key, which is typically a combination of key fields, is used to determine if a packet belongs to a particular flow. Non-key fields of the flow cache are not used to create or characterize a flow, but rather represent information about the flow that is collected by the IPFIX exporter. Examples of key fields include the 5-tuple (i.e., source IP address, destination IP address, source port number, destination port number, and protocol) and examples of non-key fields include byte count, packet count, start of system uptime, end of system uptime, and next hop IP address. In conventional IPFIX implementations, flow entries (also referred to as flow records) are maintained in the flow cache until the flows are considered to have terminated, or "expired." While the IPFIX protocol does not specify exactly when or how flow entries should be expired, the IPFIX protocol does provide some examples of when the metering process should consider a flow entry to have expired. Expiration of a flow entry may be based on, for example:

1) active timeout—the flow has been active for a specified period of time;

2) idle timeout—no packets of a flow have been identified for a specified period of time, e.g., in the range of seconds to minutes;

3) resource constraints—e.g., algorithm-based constraints to ensure certain resources are not overrun, e.g., cache memory shortage;

4) natural expiration—e.g., detection of a TCP packet with a set field for FIN or RST, which is an indication that a flow has been terminated;

5) emergency expiration—e.g., expiring some number of flow entries when the flow cache is full; and 6) cache flush—e.g., all cache flow entries are expired due to a system condition that triggers a cache flush.

Figure 4:
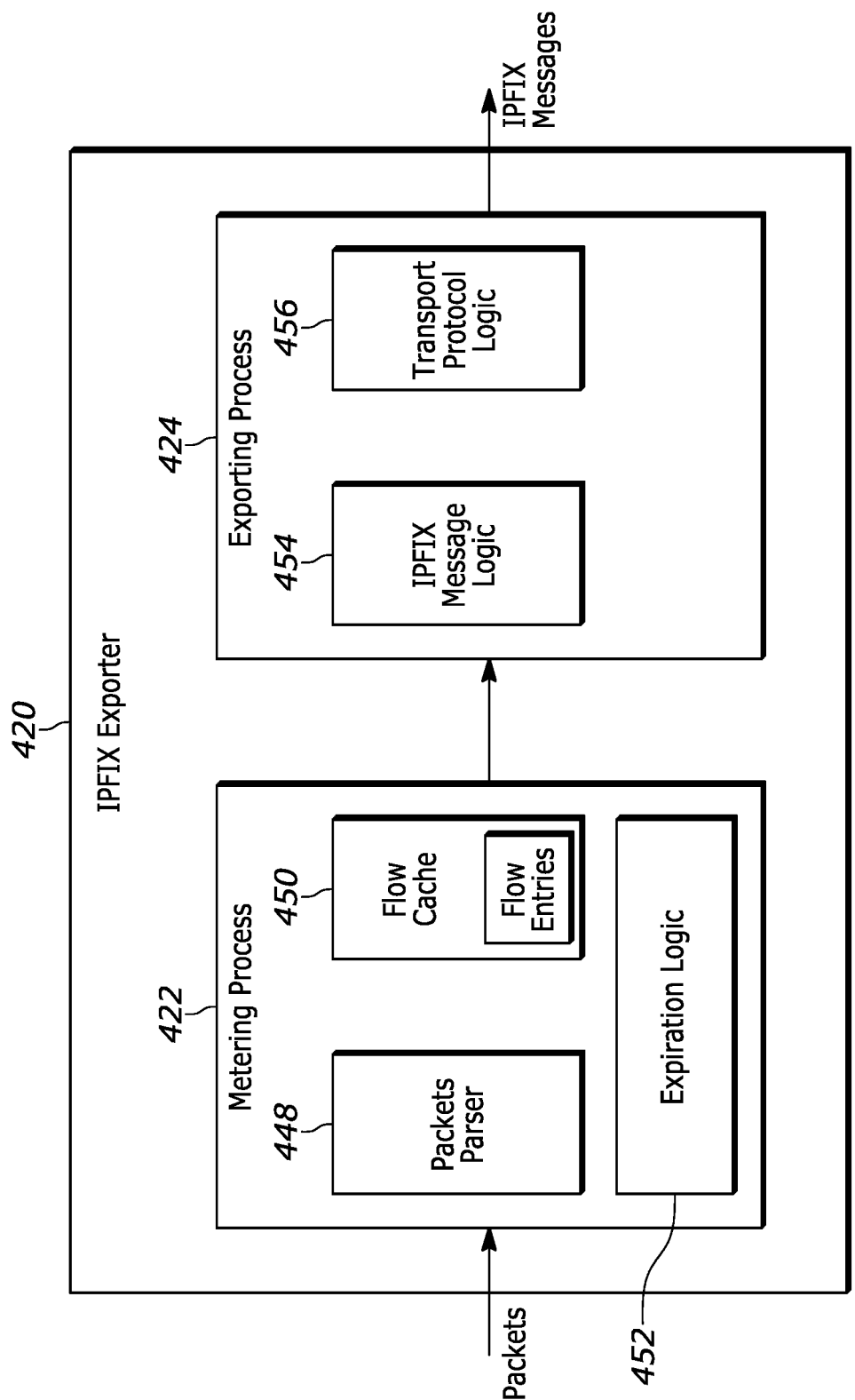
FIG. 4 illustrates an example of an IPFIX exporter that includes a metering process functional block and an exporting process functional block.

In typical operation of the IPFIX protocol at an IPFIX exporter, the expiration of an IP flow triggers the export of flow information (e.g., IPFIX message(s)) related to the IP flow. FIG. 4 illustrates an example of an IPFIX exporter 420 in which the metering process functional block 422 includes a packet parser 448, a flow cache 450, and expiration logic 452, and the exporting process functional block 424 includes IPFIX message logic 454 and transport protocol logic 456. In operation, packets are received at the metering process and parsed by the packet parser to generate flow keys (e.g., based on the 5-tuple), to identify flows, and to identify information elements. Information about the IP flows (e.g., byte count and/or packet count) is stored in the flow cache as part of the flow entries and the expiration logic determines when flow entries have expired. When a flow entry expires, the exporting process is triggered for that flow and the IPFIX message logic builds an IPFIX message that relates to the IP flow. Typically, the IPFIX messages include some information elements (IEs) from the key fields of the flow cache (e.g., source/destination IP addresses) and some IEs from the non-key fields of the flow cache (e.g., byte count and/or packet count). In an embodiment, the IPFIX message logic is configured to build all of the IPFIX messages according to a specified template ID. In conventional IPFIX exporters, one template ID is used for all exports of IPv4 flows and another template ID is used for all exports of IPv6 flows. Once an IPFIX message is generated, the IPFIX message is transmitted to a collector according to a specified transport protocol, e.g., TCP, UDP, SCTP. In conventional IPFIX exporters, the specified transport protocol is configured once and applied is the same for all IP flows.

FIG. 5 depicts a table 558 of parameters that correspond to conventional IPFIX export of IP flow information. The table includes a flow key column, a flow cache entry expiration column, and export rules columns, including when, what (e.g., template ID), where/who (e.g., collector name/address), and how (e.g., TCP, UDP, SCTP). As shown in the table of FIG. 5, the flow key is typically a 5-tuple (e.g., source IP address, destination IP address, source port number, destination port number, and protocol) and the export of IP flow information is triggered by the expiration of a flow cache entry. As explained above, expiration of a flow cache entry is typically as a result of an active timeout, an idle timeout, a resource constraint, a natural expiration (e.g., a TCP FIN/RST flag set), an emergency expiration (e.g., flow cache is full), or a flow cache flush. Once a flow cache entry for a particular IP flow expires, the export process begins immediately and an IPFIX message is sent to a particular collector (e.g., collector X) via a designated protocol (e.g., TCP). Additionally, the same set of export rules is typically applied to every flow that is tracked in the flow cache. In some cases, the particular export rule applied to an IP flow may be customized for a particular IP flow, but the IP flows are still identified solely by their 5-tuple and exported immediately upon expiration of the corresponding flow cache entry. While the conventional approach to flow monitoring works well, the flexibility of flow information export through convention IPFIX is somewhat limited.

In accordance with an embodiment of the invention, a technique for exporting network information from an exporter to a collector involves updating a non-key field of a flow entry in a flow cache that corresponds to a flow, setting a field in a context-bitmap of the flow entry in response to updating the non-key field of the flow entry, identifying an export policy using the context-bitmap, and exporting information related to the flow to a collector according to the export policy. In an embodiment, the information is exported according to the IPFIX protocol. In an embodiment, the context-bitmap includes bits that correspond to some aspect of the flow beyond simply the 5-tuple of the flow and a packet/byte count, such as security context, performance context, latency context, error context, whether the flow is dormant or active, and/or whether the flow is short-lived or long-lived and export rules are identified in view of the flow context. Thus, using the context-bitmap one export rule can be applied to a flow that is identified as a short-lived flow while a different export rule can be applied to a flow that is identified as a long-lived flow. For example, a flow deemed to be short-lived can trigger an immediate export of flow information while a flow deemed to be long-lived can trigger a more opportunistic export of flow information, or a flow deemed to be dormant can trigger no export of flow information while a flow deemed to be active can trigger a scheduled export of flow information. By maintaining a context-bitmap according to context intelligence and identifying an export rule using the context-bitmap, context-directed export of flow information can be accomplished. Context-directed export of flow information can provide a more intelligent way of exporting flow information than is currently provided by conventional flow information export techniques that are directed by the expiration of flow cache entries. In an embodiment, the context-directed export can be implemented in the data plane of a SmartNIC to handle a large volume of flows at line rate.

Figure 6:
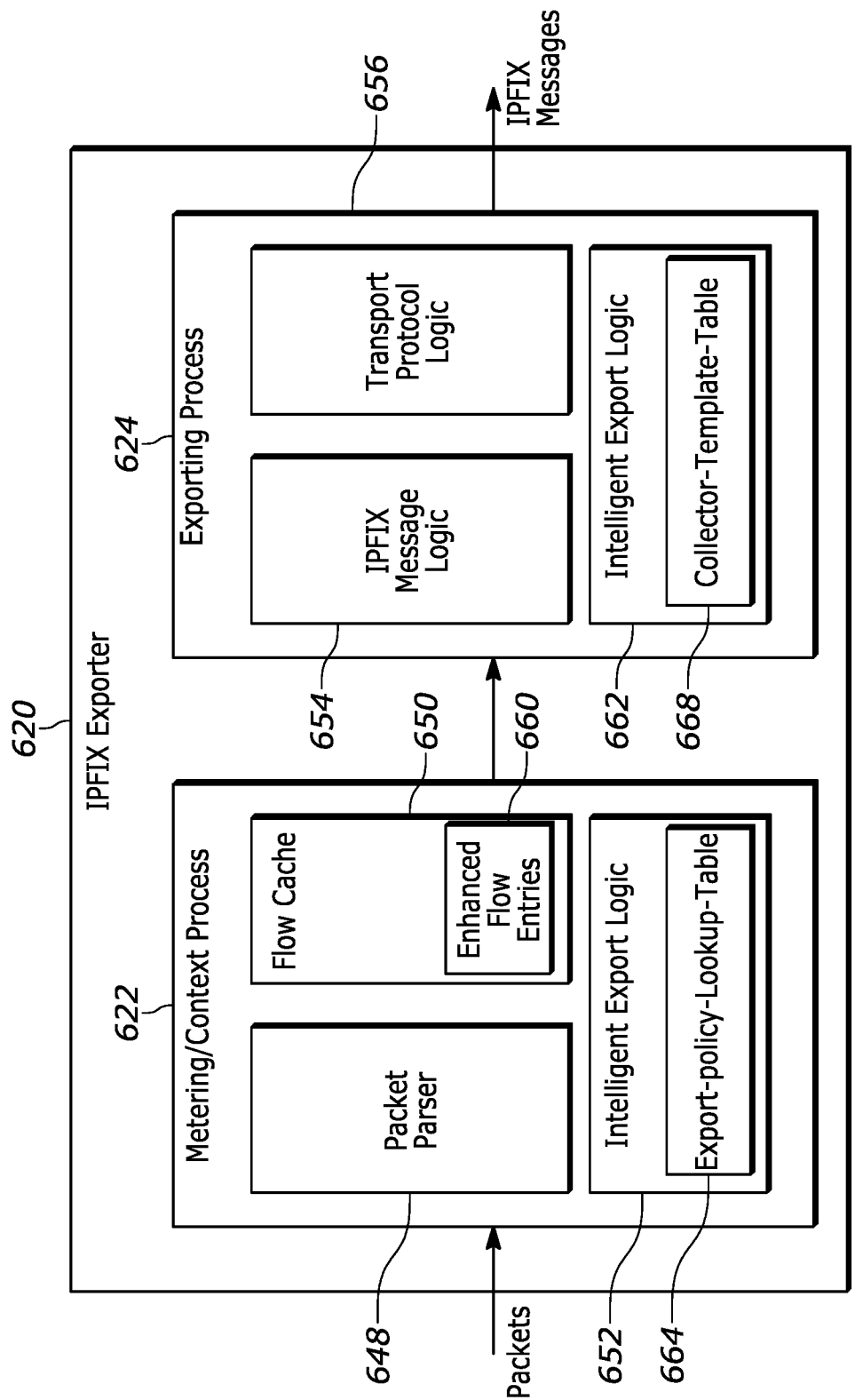
FIG. 6 illustrates an example of an IPFIX exporter that is configured to implement context-directed export of flow information in accordance with an embodiment of the invention.

FIG. 6 illustrates an example of an IPFIX exporter 620 that is configured to implement context-directed export of flow information in accordance with an embodiment of the invention. The IPFIX exporter depicted in FIG. 6 is similar to the IPFIX exporter depicted in FIG. 4, but the IPFIX exporter includes a flow cache 650 with enhanced flow entries 660 and intelligent export logic 652 that is configured to implement context-directed export of flow information. As depicted in FIG. 6, the exporter includes a metering/context process functional block 622 that includes a packet parser 648, a flow cache 650, and the intelligent export logic 652, and the exporting process functional block 624 includes IPFIX message logic 654, transport protocol logic 656, and intelligent export logic 662. In an embodiment, the IPFIX exporter is implemented in the data plane of a SmartNIC. In operation, packets are received at the metering/context process and the packets are parsed to generate flow keys, to identify flows, and to identify information elements. In an embodiment, a flow corresponds to an entry maintained in the flow cache. Entries in the flow cache are commonly tracked by flow keys that have unique 5-tuples (e.g., a unique combination of source IP addressed, destination IP address, source port number, destination port number, and protocol), however, entries in the flow cache may be identified by other criteria. Examples of flows and corresponding flow keys include:

1) A Single-Client-Server-Connection-flow originating from a client to a server to access a specific service on the concerned server via a single connection using a transport protocol in Transmit (Tx) and Receive (Rx) directions: Flow-key=Tx, Rx, protocol, client-ip, server-ip, client-portnum, server-portnum;

2) An Aggregated-Client-Server-Connection-flow originating from a client to a server to access a specific service on the concerned server via multiple connections using a transport protocol in Transmit (Tx) and Receive (Rx) directions: Flow-key=Tx, Rx, protocol, client-ip, server-ip, server-portnum;

3) An Aggregated-All-Services-Client-Server-Connection-flow originating from a client to a server to access all kinds of possible services made available on the concerned server via multiple connections using a transport protocol in Tx/Rx: Flow-key=Tx, Rx, protocol, client-ip, server-ip;

4) An Aggregated-All-Servers-Client-Connection-flow originating from a client to all the servers to access all kinds of possible services made available on the concerned servers via multiple connections using a transport protocol in Tx/Rx: Flow-key=Tx, Rx, protocol, client-ip;

5) An Aggregated-All-Clients-All-Servers-Connection-flow originating from all clients to all the servers to access all kinds of possible services made available on the concerned servers via multiple connections using a transport protocol in Tx/Rx: Flow-key=Tx, Rx, protocol;

6) An Aggregated-Device-Connection-flow originating from all clients to all the servers to access all kinds of possible services made available on the concerned servers via multiple connections using all kinds of transport protocols in Tx/Rx: Flow-key=Tx, Rx.

Information about IP flows is stored in the flow cache 650 as enhanced flow entries 660 and the intelligent export logic 652 of the metering/context process functional block 622 is configured to implement context-directed export of flow information according to context-directed export rules that are configured within the IPFIX exporter. In the embodiment of FIG. 6, the intelligent export logic includes an export-policy-lookup-table 664 that maps context-bitmap keys to export policies. Once the intelligent export logic determines that an export of information is triggered, the information to be exported is provided to the exporting process functional block 624. The IPFIX message logic 654 builds an IPFIX message for the flow according to the intelligent export logic 662. In the embodiment of FIG. 6, the intelligent export logic includes a collector-template-table 668 that maps flow context to export rules. In an embodiment, the IPFIX message logic is configured to select template IDs on a per-flow basis based on an understanding of the context of each flow that extends beyond simply the IP version of the flow, which is in contrast to conventional techniques that apply the same template ID to each IPv4 flow and the same template ID to each IPv6 flow. Once an IPFIX message is generated, the IPFIX message is transmitted by the transport protocol logic 656 according to a desired transport protocol, e.g., TCP, UDP, SCTP, as determined by the intelligent export logic 662.

As mentioned above, the flow cache 650 includes enhanced flow entries 660. FIG. 7 depicts an example of enhanced flow cache entries 760 that are held in a flow cache in accordance with an embodiment of the invention. In the embodiment of FIG. 7, the enhanced flow entries include key fields 770 and non-key fields 772. The key fields for each flow cache entry may include, for example, 5-tuple flow key fields, 4-tuple flow key fields, 3-tuple flow key fields, 2-tuple flow key fields, 1-tuple flow key fields, and Tx/Rx direction fields as described above. The non-key fields for each flow cache entry include various context fields and a context-bitmap. Information that may be held in the context fields of a flow entry is described in more detail with reference to FIG. 8 and information that may be held in the context-bitmap field of a flow entry is described in more detail with reference to FIG. 9. In an embodiment, the flow cache is stored in high speed memory, such as RAM and/or Content Addressable Memory (CAM).

Figure 8:
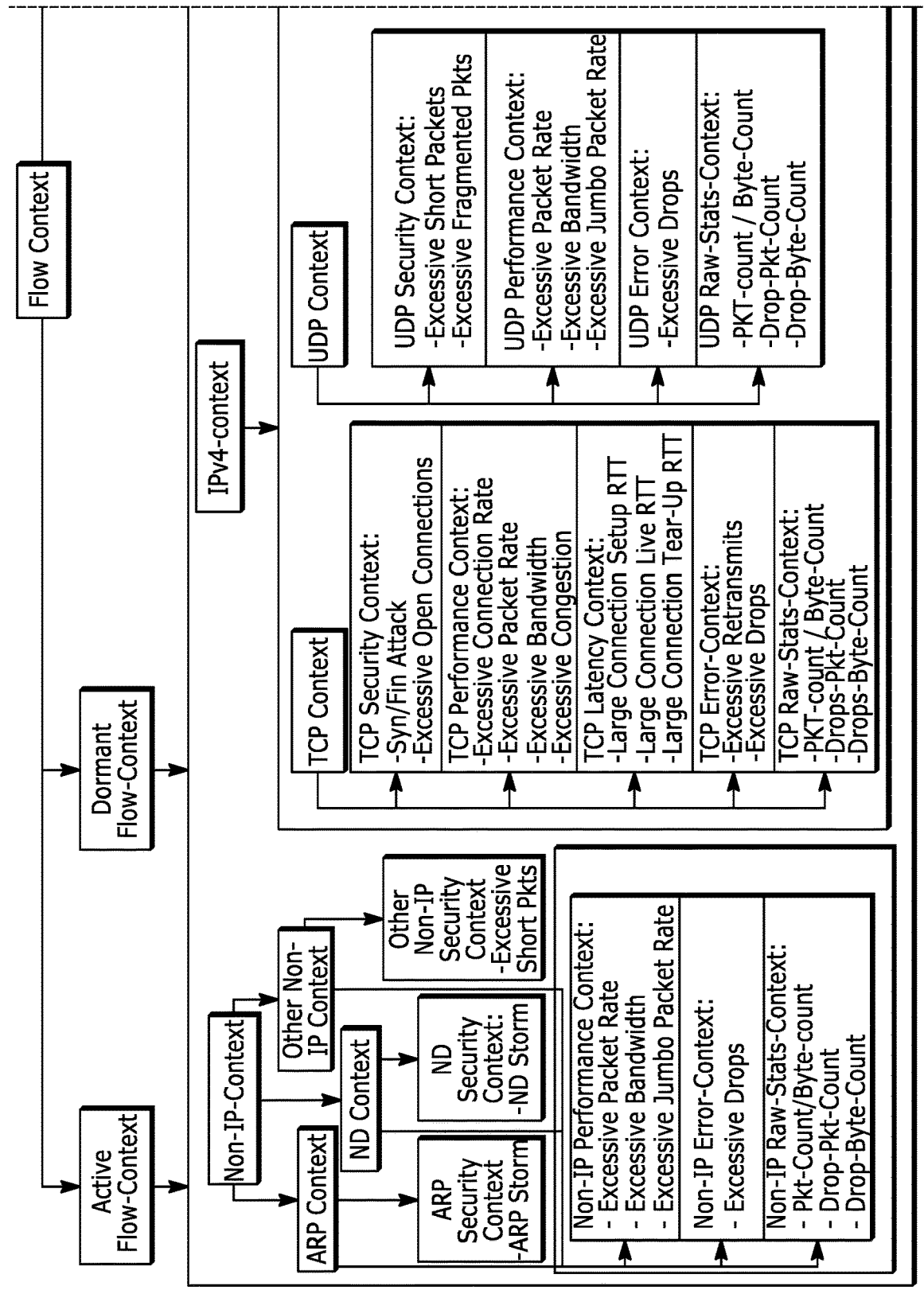
FIG. 8 depicts a hierarchical representation of criteria that may provide context for a flow for use in context-directed IPFIX.
Figure 8:
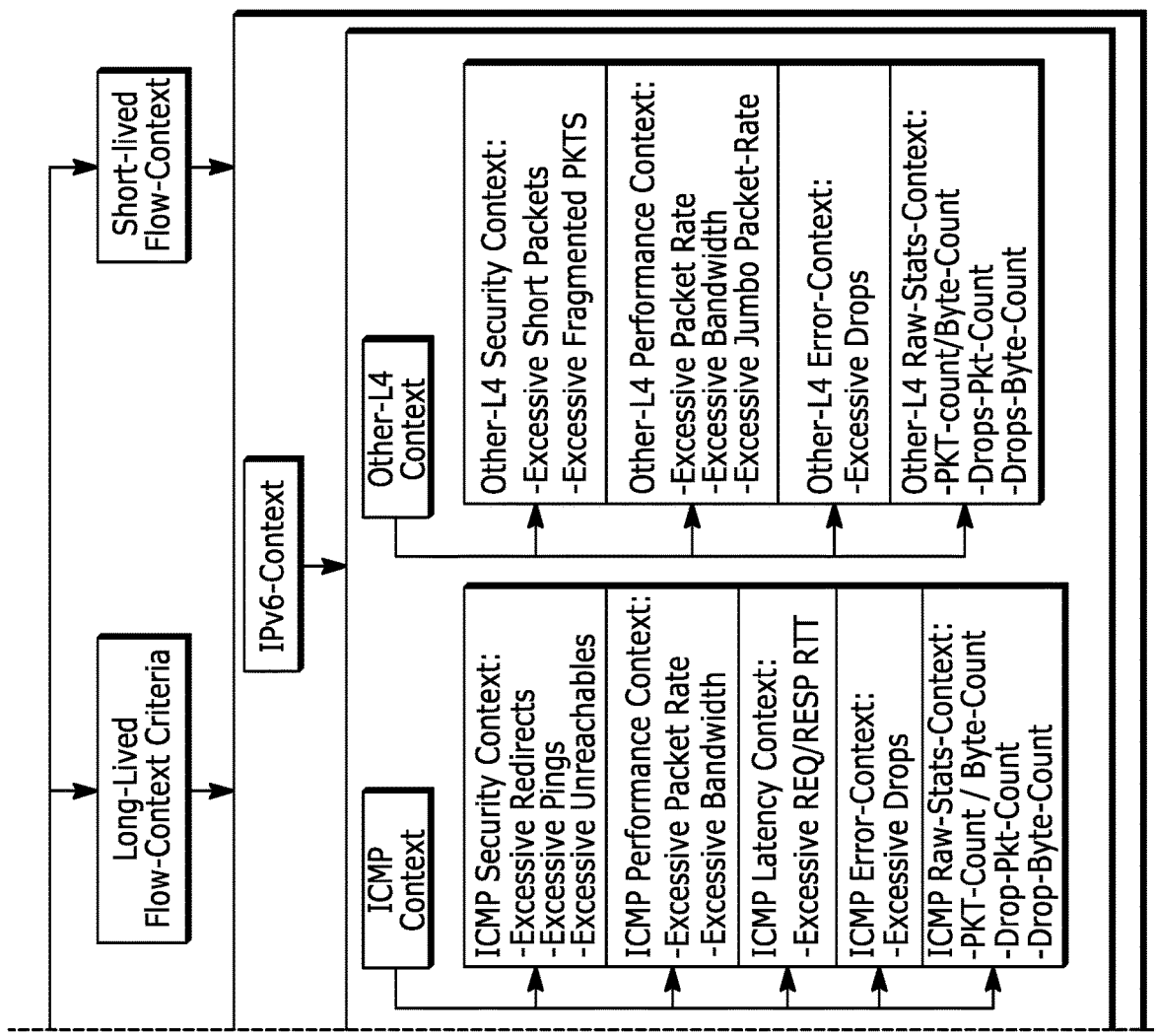

With reference to FIG. 8, criteria that may provide context for a flow is graphically represented in a hierarchical manner. In one example, the context of a flow may be characterized in terms of whether the flow is an active flow, a dormant flow, a long-lived flow, or a short-lived flow. In another example, the context of a flow may be characterized in terms of whether the flow is IP-based flow (e.g., IPv4 or IPv6) or a non-IP-based flow. With regard to IP-based flows, the context of a flow may be characterized in terms of whether the flow has TCP context, UDP context, ICMP context, or other Layer 4 (L4) context. With respect to TCP context, the context of a flow may be characterized in terms of TCP security context, TCP performance context, TCP latency context, TCP error context, and TCP raw statistics context. For example, the security context may include information related to a SYN/FIN attack or excessive open connections, the TCP performance context may include information related to an excessive connection rate, an excessive packet rate, and excessive bandwidth, and/or excessive congestion, the TCP latency context may include information related to a large connection setup round-trip-time (RTT), a large connection live RTT, and/or a large connection tear-down RTT, the TCP error context may include excessive retransmissions and/or excessive drops, and the TCP raw statistics context may include packet count/byte count, dropped packet count, and/or dropped byte count.

With respect to UDP context, the context of a flow may be characterized in terms of UDP security context, UDP performance context, UDP error context, and UDP raw statistics context. For example, the UDP security context may include information related to excessive short packets and/or excessive fragmented packets, the UDP performance context may include information related to an excessive packet rate, an excessive bandwidth, and/or an excessive jumbo packet rate, the UDP error context may include excessive drops, and the UDP raw statistics context may include packet count/byte count, dropped packet count, and/or dropped byte count.

With respect to ICMP context, the context of a flow may be characterized in terms of ICMP security context, ICMP performance context, ICMP latency context, ICMP error context, and ICMP raw statistics context. For example, the ICMP security context may include information related to excessive redirects, excessive pings, or excessive unreachable destinations, the ICMP performance context may include information related to an excessive packet rate and/or excessive bandwidth, the ICMP latency context may include information related to excessive drops, and the ICMP raw statistics context may include packet count/byte count, dropped packet count, and/or dropped byte count.

With respect to other L4 context, the context of a flow may be characterized in terms of other L4 security context, other L4 performance context, other L4 error context, and other L4 raw statistics context. For example, the other L4 security context may include information related to excessive short packets and/or excessive fragmented packets, the other L4 performance context may include information related to excessive packet rate, an excessive bandwidth, and/or excessive jumbo packet rate, the other L4 error context may include excessive drops, and the other-L4 raw statistics context may include packet count/byte count, dropped packet count, and/or dropped byte count.

With respect to non-IP-based flows, the non-IP context of a flow may be characterized in terms of whether the flow has ARP context, ND context, or other non-IP context. With respect to the ARP context, the context of a flow may be characterized in terms of ARP security context. For example, the ARP security context may include information related to an ARP storm. With respect to the ND context, the context of a flow may be characterized in terms of ND security context. For example, the ND security context may include information related to an ND storm. With respect to the other non-IP context, the context of a flow may be characterized in terms of other non-IP security context. For example, the other non-IP security context may include information related to an excessive number of short packets.

With respect to the ARP context, the ND context, and the other non-IP context, the context of a flow may be characterized in terms of non-IP performance context, non-IP error context, and non-IP raw statistics context. For example, the non-IP performance context may include information related to an excessive packet rate, an excessive bandwidth, and/or an excessive jumbo packet rate, the non-IP error context may include excessive drops, and the non-IP raw statistics context may include packet count/byte count, dropped packet count, and/or dropped byte count.

Although graphically represented in a hierarchical manner, the flow contexts may be visualized in other manners that may not reflect any type of hierarchy.

Referring back to FIG. 7, an enhanced flow entry 760 in the flow cache may include information related to one or more of the contexts described with reference to FIG. 8. In addition to the key fields 770, the non-key fields 772 may include fields that are used to provide context to a flow. For example, the non-key fields of the enhanced flow cache entries may include security context fields, performance context fields, latency context fields, error context fields, and raw statistics context fields that are used to hold corresponding security, performance, latency, error, and raw statistics information. In an embodiment, the non-key fields include fields to hold information corresponding to the security, performance, latency, error, and raw data context as described with reference to FIG. 8.

With respect to the security context fields, the security context fields may include fields to store data corresponding to any of the security contexts described with reference to FIG. 8. For example, the security context fields may include fields to store a count of SYN/FIN flags and/or a count of open connections (TCP security context), a count of short packets and/or a count of fragmented packets (UDP security context), a count of redirects, a count of pings, and/or a count of unreachables (ICMP security context), a count of short packets and/or a count of fragmented packets (other-L4 security context), a count of ARP requests (ARP security context), a count of Neighbor Discovery (ND) requests (ND security context), and a count of short packets (other non-IP security context). In an embodiment, ND in IPv6 serves a similar function as ARPs in IPv4.

With respect to the performance context fields, the performance context fields may include fields to store data corresponding to any of the performance contexts described with reference to FIG. 8. For example, the performance context fields may include fields to store a count of connection rates, packet rates, bandwidth, and or congestion (TCP performance context), packet rates, bandwidth, and/or jumbo packet rates (UDP performance context), packet rates and/or bandwidth (ICMP performance context), packet rates, bandwidth, and/or jumbo packet rates (other-L4 performance context), packet rates, bandwidth, and/or jumbo packet rates (ARP performance context, ND performance context, and/or other non-IP performance context).

With respect to the latency context fields, the latency context fields may include fields to store data corresponding to any of the latency contexts described with reference to FIG. 8. For example, the latency context fields may include fields to store a connection setup RTT, a connection live RTT, and a connection tear-down RTT (TCP latency context), and a count of request/response RTT (ICMP latency context).

With respect to the error context fields, the error context fields may include fields to store data corresponding to any of the error contexts described with reference to FIG. 8. For example, the error context fields may include fields to store a count of retransmission and/or drops (TCP error context), a count of drops (UDP error context), a count of drops (ICMP error context), a count of drops (other-L4 error context), a count of drops (ARP security, ND security, and/or other non-IP security context).

With respect to the raw statistics context fields, the raw statistics context fields may include fields to store data corresponding to any of the statistics contexts described with reference to FIG. 8. For example, the statistics context fields may include fields to store a packet count, a byte count, a dropped packet count, and/or a dropped byte count (TCP raw statistics context), a packet count, a byte count, a dropped packet count, and/or a dropped byte count (UDP raw statistics context), a packet count, a byte count, a dropped packet count, and/or a dropped byte count (ICMP raw statistics context), a packet count, a byte count, a dropped packet count, and/or a dropped byte count (other-L4 raw statistics context), and a packet count, a byte count, a dropped packet count, and/or a dropped byte count (non-IP raw statistics context, and/or ARP security, ND security, other non-IP security context).

The non-key fields may also include various timestamps related to received packets to determine, for example, active/dormant and/or long-lived/short-lived. Additionally, the non-key fields may include other fields to hold information related to other flow-related contexts.

Figure 9:
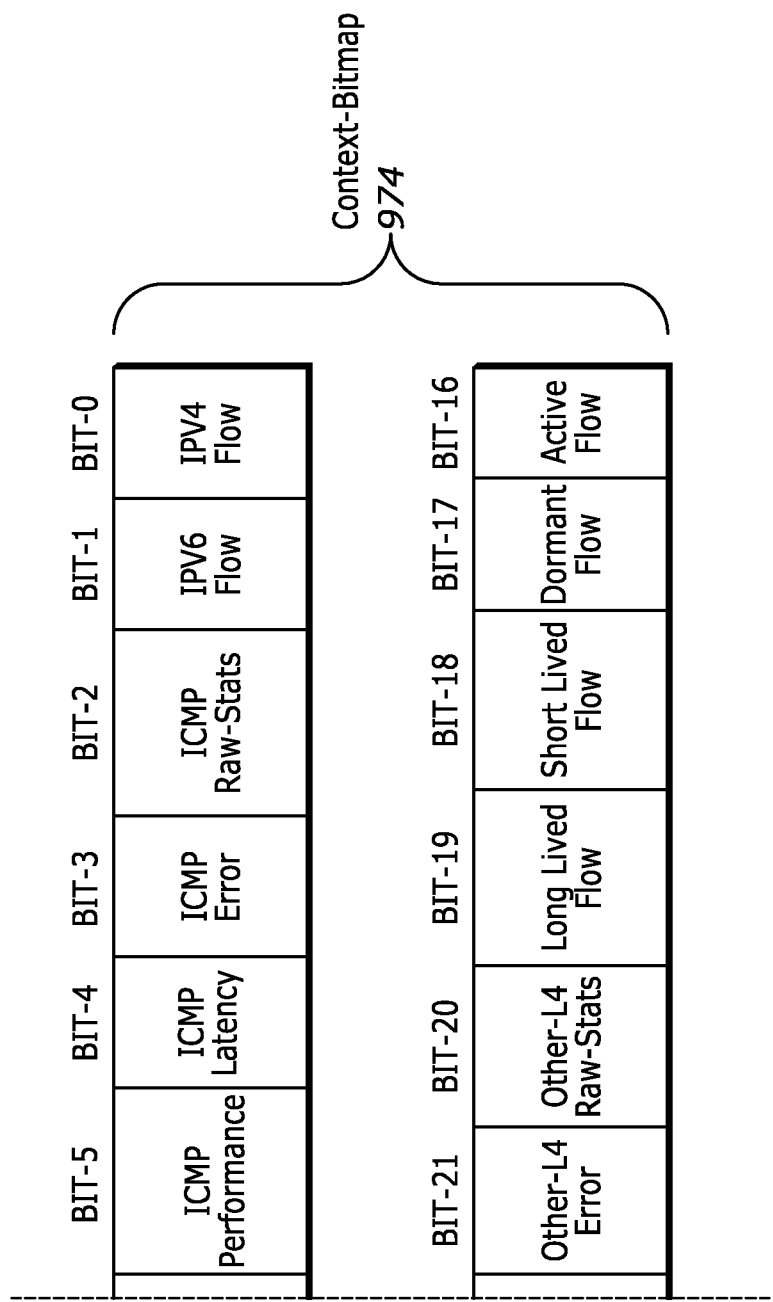
FIG. 9 depicts an example of a 32-bit content-bitmap in which bits in the context-bitmap field correspond to different contexts of a flow.

As shown in FIG. 7, the non-key fields 772 of the enhanced flow entries 760 of the flow cache also include a context-bitmap field 774 to store a context-bitmap that includes a set of context-specific bits. FIG. 9 depicts an example of a 32-bit content-bitmap 974 in which bits in the context-bitmap field correspond to different contexts of a flow. In the example of FIG. 9, each bit in the context-bitmap corresponds to a particular flow context as:

Bit-0: IPv4 flow
Bit-1: IPv6 flow
Bit-2: ICMP raw-stats
Bit-3: ICMP error
Bit-4: ICMP latency
Bit-5: ICMP performance
Bit-6: ICMP security
Bit-7: UDP raw-stats
Bit-8: UDP error
Bit-9: UDP performance
Bit-10: UDP security
Bit-11: TCP raw-stats
Bit-12: TCP error
Bit-13: TCP latency
Bit-14: TCP performance
Bit-15: TCP security
Bit-16: active flow
Bit-17: dormant flow
Bit-18: short-lived flow
Bit-19: long-lived flow
Bit-20: other-L4 raw-stats
Bit-21: other-L4 error
Bit-22: other-L4 performance
Bit-23: other-L4 security
Bit-24: ND security
Bit-25: ARP security
Bit-26: non-IP raw-stats
Bit-27: non-IP error
Bit-28: non-IP performance
Bit-29: non-IP security
Bit-30: RSVD-2
Bit-31: RSVD-1

Although the context-bitmap 974 depicted in FIG. 9 is provided as an example, the context-bitmap may include other combinations of bits. For example, the context-bitmap may not include all of the bits shown in FIG. 9, the context-bitmap may include some bits that are different than those shown in FIG. 9, or the context-bitmap may include a larger set of bits. In an embodiment, a bit of the context bitmap is "set" by flipping the bit from "0" to "1" or flipping the bit from "1" to "0."

Referring back to FIG. 6, in operation, as packets are received by the IPFIX exporter 620, packet headers are parsed by the packet parser 648 to identify a flow, or flows, to which the packets belong. For example, the packet headers are parsed to identify flow keys as is known in the field. Additionally, the flow entries corresponding to parsed packets are updated in response to received packets. For example, any of the data that corresponds to the contexts described with reference to FIG. 8 may be updated in the corresponding fields of the corresponding flow entries.

In an embodiment, updating of an enhanced flow entry in the flow cache involves updating a non-key field, or fields, in an enhanced flow entry and setting a bit, or bits, in the context-bitmap based on context-based logic/intelligence that is implemented by the IPFIX exporter. For example, operations of the IPFIX exporter are implemented in a data plane of the edge device, using for example, a P4 pipeline. In an embodiment, the bits in the context-bitmap are set (also referred to as "dirtied") based on some evaluation of data stored in a non-key field relative to some criteria. For example, with respect to a particular flow in the TCP context (see FIG. 8, TCP context), the intelligent export logic may execute logic related to the TCP security context, the TCP performance context, the TCP latency context, the TCP error context, and/or the TCP raw-statistics context. Specifically, with respect to the TCP security context, the intelligent export logic may compare a count of SYN/FIN flags that is held in the enhanced flow entry to a SYN/FIN flag threshold to determine if the corresponding flow may be under a SYN/FIN attack. If the count of SYN/FIN flags exceeds the SYN/FIN flag threshold, then the TCP security bit (e.g., bit-15) of the context-bitmap in the enhanced flow entry is set (e.g., changed from "0" to "1"). Likewise, the intelligent export logic may compare a count of open connections that is held in the enhanced flow entry to an open connection threshold to determine if the corresponding flow may be a security risk. If the count of open connections exceeds the open connection threshold, then the TCP security bit (e.g., bit-15) of the context-bitmap is set.

Similarly, with respect to the TCP performance context, the intelligent export logic may compare a connection rate held in the enhanced flow entry to a connection rate threshold to determine if the corresponding flow exceeds a predefined rate threshold. If the connection rate exceeds the predetermined rate threshold, then the TCP performance bit (e.g., bit-14) of the context-bitmap held in the enhanced flow entry is set (e.g., changed from "0" to "1"). Likewise, the intelligent export logic may compare a count of open connections held in the enhanced flow entry to an open connection threshold to determine if the flow is having performance issues. If the count of open connections exceeds the open connection threshold, then the TCP security bit (e.g., bit-14) of the context-bitmap is set.

Similarly, with respect to the TCP latency context, the intelligent export logic may compare a connection setup RTT that is held in the enhanced flow entry with a connection setup RTT threshold to determine if the corresponding flow is exceeding a predefined connection setup RTT threshold, may compare a connection live RTT that is held in the enhanced flow entry with a connection live RTT threshold, and/or may compare a connection tear-down RTT that is held in the enhanced flow entry with a connection tear-up RTT threshold. If the connection setup RTT exceeds the connection setup RTT threshold, if the connection live RTT exceeds the connection live RTT threshold, and/or if the connection tear-down RTT exceeds the connection tear-up RTT threshold, then the TCP latency bit (e.g., bit-13) of the context-bitmap is set (e.g., changed from "0" to "1").

Similarly, with respect to the TCP error context, the intelligent export logic may compare a count of retransmissions held in the enhanced flow entry with a retransmission threshold and/or a count of drops held in the enhanced flow entry with a drop threshold. If the count of retransmission exceeds the retransmission threshold and/or if the count of drops exceeds the drop threshold, then the TCP error bit (e.g., bit-12) of the context-bitmap is set (e.g., changed from "0" to "1").

Similarly, with respect to the TCP raw statistics context, the intelligent export logic may compare a packet count held in the enhanced flow entry to a byte count threshold, a byte count held in the enhanced flow entry to a byte count threshold, a dropped packet count held in the enhanced flow entry to a dropped packet count threshold, and/or a dropped byte count held in the enhanced flow entry to a dropped byte count threshold to determine if the flow is exceeding a dropped byte count threshold. If the packet count exceeds the packet count threshold, if the byte count exceeds the byte count threshold, if the dropped packet count exceeds the dropped packet count threshold, and/or if the dropped byte count exceeds the dropped byte count threshold, then the TCP raw statistics bit (e.g., bit-11) of the context-bitmap is set (e.g., changed from "0" to "1").

The process of updating the non-key fields of enhanced flow entries in the flow cache is implemented on a continuous basis for all of the context fields (see FIG. 8) and for all of the bits in the context-bitmap. For example, the data held in the context data fields of the enhanced flow entries is updated for all flows held in the flow cache. In an embodiment, counters that hold information related to the contexts of FIG. 8 are updated upon receipt of packets. The intelligent export logic then compares the data held in the "information/statistics" portion of the enhanced flow entries (e.g., the non-key fields other than the context-bitmap) with the corresponding context thresholds to determine if the state of bits in the context-bitmap should be changed. In an embodiment, there are default thresholds that can be preprogrammed into the intelligent export logic. Additionally, in an embodiment, default thresholds can be customized on a global basis or on a per-flow basis, or combination thereof for different contexts. Further, certain profiles can be established that enumerate a set of thresholds for different categories or classes of flows. In an embodiment, the intelligent export logic (e.g., as executed in a P4 pipeline of the data plane) compares information/statistics held in the non-key field(s) of an enhanced flow entry immediately upon on update of the corresponding information/statistic.

The context-bitmap portion of an enhanced flow entry is used as a key to lookup an export policy. For example, the 32-bit context-bitmap is used as a key to lookup an export policy in an export policy lookup table (e.g., export-policy-lookup-table 664, FIG. 6). In an embodiment, the export policies include an action element and a parameters element. The action element indicates when to implement an export operation and the parameters element indicates where an export should be directed (e.g., a collector or collectors) and what to export (e.g., an IPFIX template). With respect to the action element of the export policy lookup table, the action element may specify, for example, immediate export, regular frequency export, delayed frequency export, correlated event driven export, or skip export. With respect to the parameters element of the export policy table, the parameters element may specify the collector, or collectors, that are the target of the export and the template (e.g., in the form of a template ID) that specifies the content and format of the information that is to be exported. In an embodiment, the action element directly identifies an action for the export while the parameters element is a pointer to a collector template table (e.g., collector-template-table 668, FIG. 6).

Figure 10:
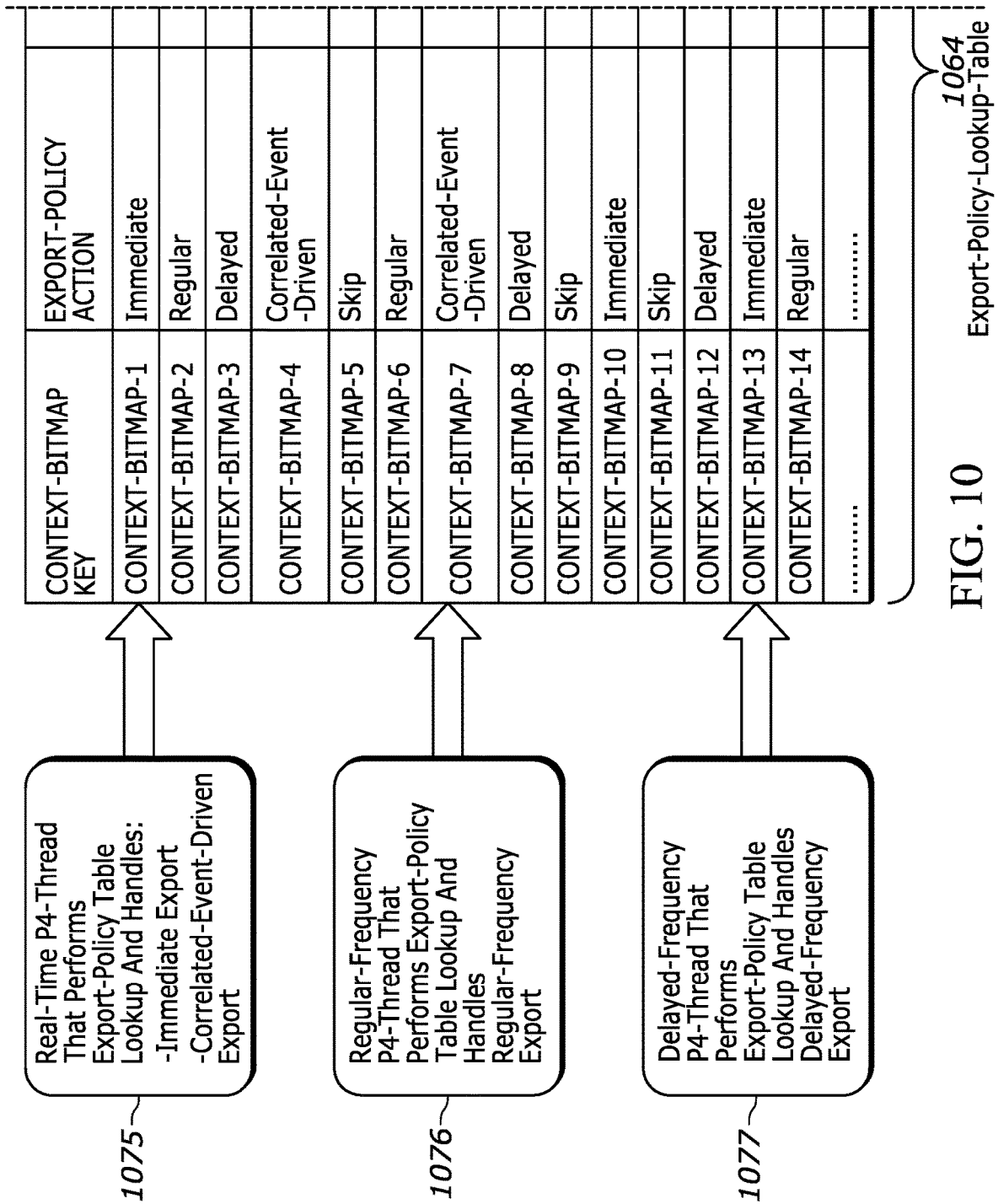
FIG. 10 illustrates how export polices can be identified using a context-bitmap from an enhanced flow entry in a flow cache.
Figure 10:
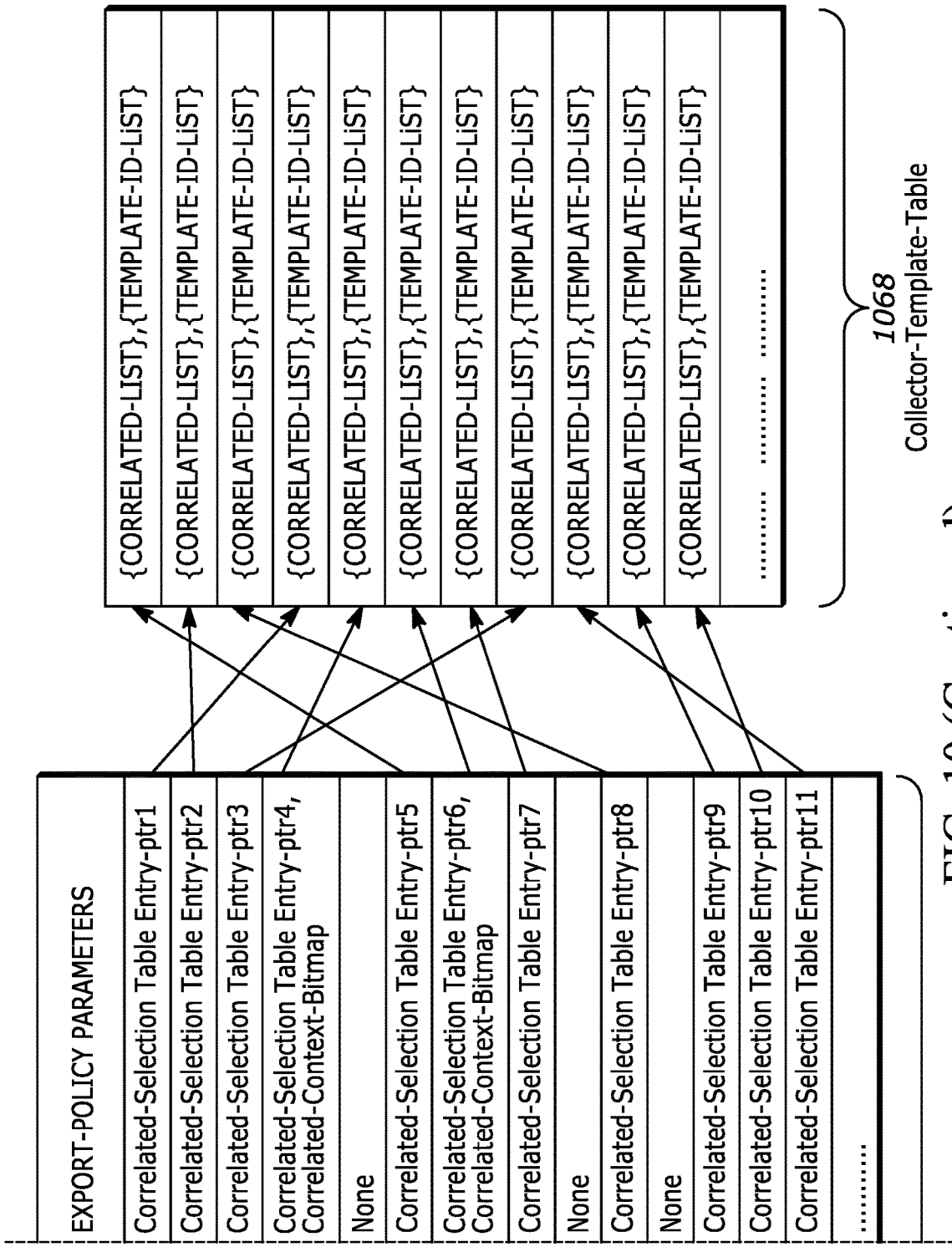

FIG. 10 illustrates how export polices can be identified using a context-bitmap from an enhanced flow entry in a flow cache. In particular, FIG. 10 shows an export-policy-lookup-table 1064 that maps context-bitmap keys to export policies, e.g., in the form of export policy actions and export policy parameters, where the export policy parameters are in the form of pointers to a collector/template table. In an embodiment, the export-policy-lookup-table 1064 can be implemented as the export-policy-lookup-table 664 in FIG. 6 and the collector-template-table 1068 can be implemented as the collector-template-table 668 in FIG. 6. With reference to FIG. 10, if a context-bitmap (also referred to as a context-bitmap key) for a flow matches "context-bitmap-1" in the export policy lookup table, then the corresponding export policy action is "immediate" and the export policy parameters is a pointer (e.g., Table Entry-ptr1) to the collector/template table. The pointer to the collector/template table points to a particular entry in the collector/template table as indicated in FIG. 10. If a context-bitmap (also referred to as a context-bitmap key) for a flow matches "context-bitmap-2" in the export policy lookup table, then the corresponding export policy action is "regular-frequency" and the export policy parameters is a pointer (e.g., Table Entry-ptr2) to the collector/template table. Again, the pointer to the collector/template table points to a particular entry in the collector/template table as indicated in FIG. 10.

In addition to the export policy lookup table and the collector template table, FIG. 10 illustrates different threads that drive lookups in the export policy lookup table. In the example of FIG. 10, three different threads include 1) a real-time P4-thread 1075 that performs export policy lookup table lookups and handles immediate export and correlated event driven exports, 2) a regular-frequency P4-thread 1076 that performs export policy lookup table lookups and handles regular frequency export, and 3) a delayed-frequency P4-thread 1077 that performs export policy lookup table lookups and handles delayed frequency export. In an embodiment, a "P4-thread" refers to a thread that is implemented in the data plane of the edge device. For example, a P4 packet processing pipeline of an edge device such as a SmartNIC may be implemented at least in part via a packet processing circuit as described below with reference to FIG. 13.

Figure 11A:
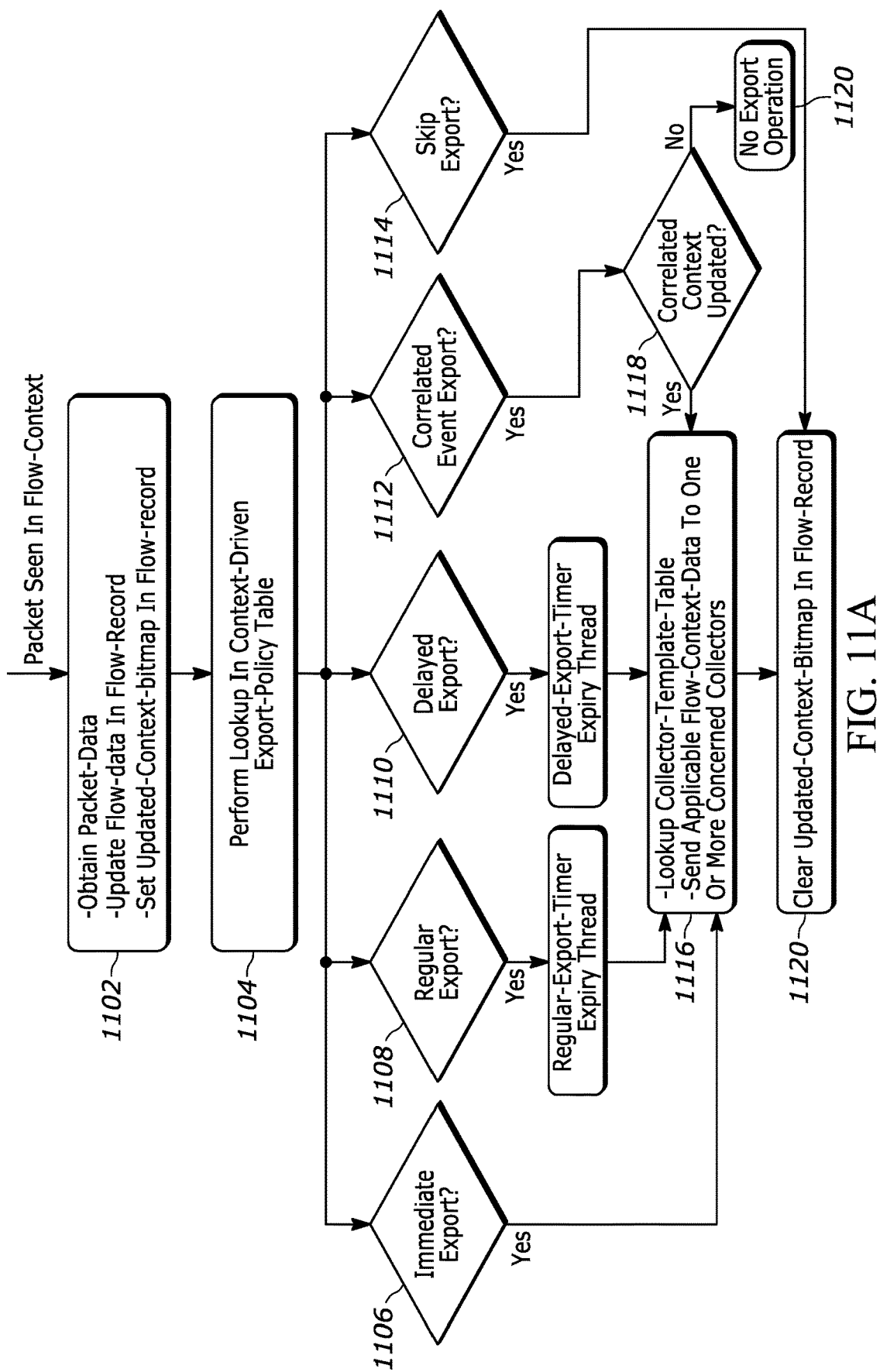
FIGS. 11A and 11B depict a process flow diagram of an embodiment of the context-driven IPFIX export.
Figure 11B:
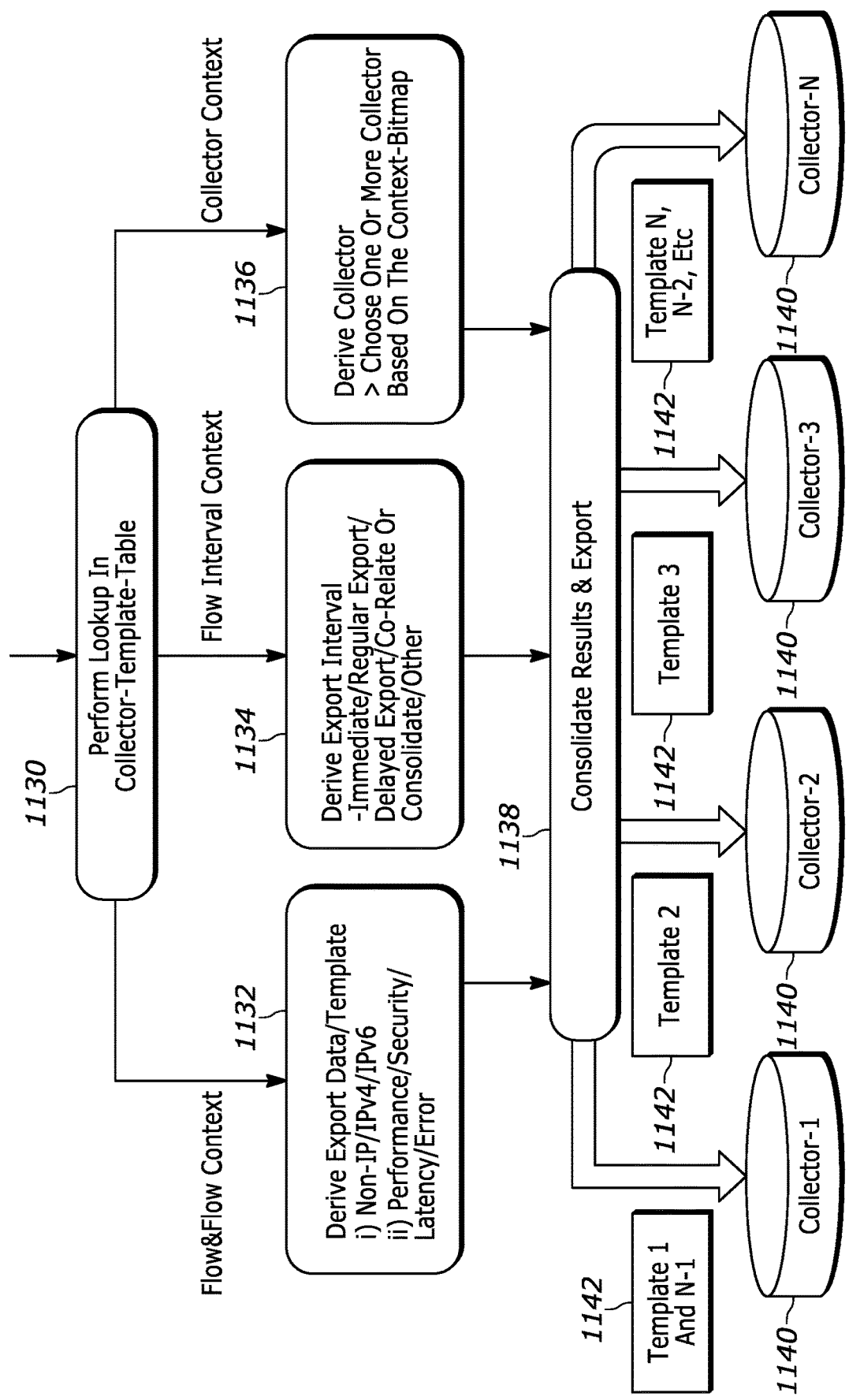

FIGS. 11A and 11B depict a process flow diagram of an embodiment of the context-driven IPFIX export. At element 1102, data related to a packet, which has been identified as corresponding to the corresponding enhanced flow entry in a flow cache, is obtained. For example, timestamp data corresponding to the packet may be obtained and/or data corresponding to the contexts described above with reference to FIGS. 7 and 8 may be extracted from the packet. The data related to the packet is used to update the non-key data portion of an enhanced flow entry. Additionally, fields in the context-bitmap of the enhanced flow entry may be updated. For example, a field in the context-bitmap may need to be updated in response to an update in a field of the non-key data portion of the enhanced flow entry. In one example, it may be that the non-key data field is a count of SYN/FIN flags that is incremented in response to a packet from the flow with a SYN flag and the incremented count SYN/FIN flags in the non-key data field may transition from not exceeding a SYN/FIN flag threshold to now exceeding the SYN/FIN flag threshold. In response to the count of SYN/FIN flags exceeding the SYN/FIN flags threshold, the "TCP security" bit in the context-bitmap is set. In an embodiment, an update of information/statistics in the non-key fields of the context-bitmap triggers the intelligent export logic to evaluate the updated information relative to some threshold/standard to determine if a corresponding bit in the context bitmap should be set.

Once the context-bitmap of a flow is updated, at element 1104 the context-bitmap of the flow is used to perform a lookup in the export policy lookup table. As described with reference to FIG. 10, the export-policy-lookup table 1064 maps values of the context-bitmap to export policies that include an export policy action and export policy parameters. Depending on the result of the export policy lookup, the process proceeds to an immediate export (element 1106), a regular export (element 1108), a delayed export (1110), a correlated event export (1112), or a skip export (element 1114).

If the export policy calls for immediate export as indicated by a "yes" at decision point 1106, then the process proceeds to element 1116. Operations associated with element 1116 are described in more detail below with reference to FIG. 11B.

If the export policy calls for regular export as indicated by a "yes" at decision point 1108, then the process proceeds to a "regular export" thread. In an embodiment, the regular export thread involves triggering an export of an IPFIX message at a regular interval. For example, the export of IPFIX messages is triggered at the expiration of a "regular interval" timer, e.g., a timer of a standard interval such as 30 seconds or 60 seconds, or between about 30-60 seconds. Although certain intervals are described, other intervals are possible.

If the export policy calls for delayed export as indicated by a "yes" at decision point 1110, then the process proceeds to a "delayed export" thread. In an embodiment, the delayed export thread involves triggering an export of an IPFIX message at a delayed interval, e.g., delayed relative to the regular interval. For example, the export of IPFIX messages is triggered at the expiration of a "delayed interval" timer, e.g., a timer of some interval greater than the "regular" or standard interval such as 5 times the standard timer interval, e.g., 150 seconds or 300 seconds, or between about 150-300 seconds. Although certain intervals are described, other intervals are possible.

If the export policy calls for correlated event export as indicated by a "yes" at decision point 1112, then the process proceeds to a "correlated event export" thread. In an embodiment, the correlated event export thread involves triggering an export of an IPFIX message upon the update of a correlated context. For example, a correlated event may involve a first threshold for a packet rate for an application and a second threshold for an overall bandwidth for the application or for a link utilization. In an embodiment, an export is triggered if both conditions are met. For example, the first condition is met (e.g., the first threshold is exceeded) at time, t0, and the second condition is met (e.g., the second threshold is exceeded) at time, t1, and as long as the flow that meets the first condition is still active at time, t1, when the second condition is met (e.g., correlated events), an IPFIX export is triggered. At element 1118, if the correlated context, or contexts, has not been updated, then no export operation is conducted (element 1120). If, however, a correlated context has been updated, then the process proceeds to element 1116.

If the export policy calls for export to be skipped as indicated by a "yes" at decision point 1114, then the process proceeds to element 1122. At element 1122, the context-bitmap of the enhanced flow entry is cleared. For example, all "set" bits in the context-bitmap are unset, e.g., "1" bits are reset to "0" bits.

Whether upon determination of an immediate export, upon expiration of a regular export timer, upon the expiration of a delayed export timer, or upon update of a correlated context, the process proceeds to element 1116. At element 1116, the pointer obtained from the export-policy-lookup-table is used to access the collector-template-table 1068, FIG. 10 (collector-template-table 668, FIG. 6). The element in the collector-template-table that is accessed with the pointer identifies the collector (or collectors) that is the target of the export and the template that is to be used for the data that is to be exported. For example, the collector is identified as an IP address or a name (in which case an IP address is resolved from the name) and the template is identified as a template ID. The collector-template-table may also identify the export protocol (e.g., TCP, UDP, or SCTP).

FIG. 11B illustrates operations associated with the exporting process. At element 1130, the pointer from the export policy lookup table is used to access an entry in the collector-template-table (e.g., collector-template-table 1068, FIG. 10). From the accessed entry in the collector-template-table, the intelligent export logic is able to derive the data and/or template for export (element 1132), to derive the export interval (element 1134), and to derive the collector (element 1136). Once aspects of the export are derived, the process proceeds to results consolidation and export (element 1138). Results may be consolidated and exported to certain collectors (elements 11140) according to specified templates (elements 1142). In an embodiment, the timing for examining the context bitmaps is a function of threads, such as the real-time P4 thread 1075, the regular-frequency P4 thread 1076, and the delayed-frequency P4 thread shown in FIG. 10. In an embodiment, each Set ID/template may have its own interval to scan the enhanced flow entries in the flow cache for all flows related to a context that is being set. In an embodiment, this consolidates all the relevant details in that interval, selects the collector that is to be exported to, and then exports the IPFIX message(s).

Figure 12:
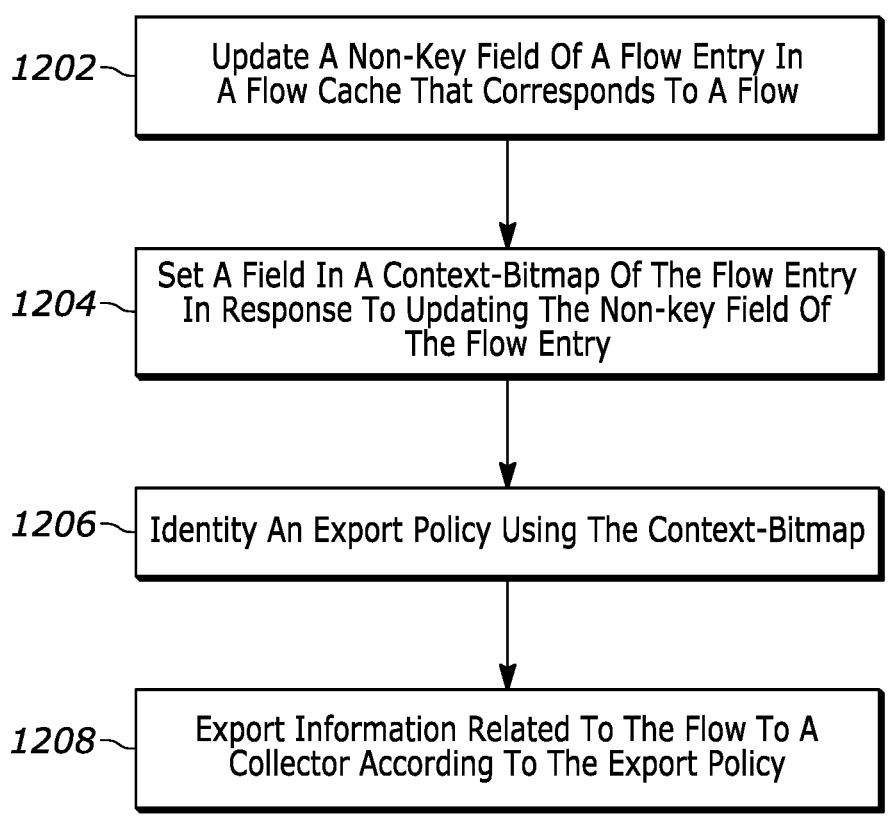
FIG. 12 is a process flow diagram of a method for exporting network information from an exporter to a collector.

FIG. 12 is a process flow diagram of a method for exporting network information from an exporter to a collector. At block 1202, a non-key field of a flow entry in a flow cache that corresponds to a flow is updated. At block 1204, a field in a context-bitmap of the flow entry is set in response to updating the non-key field of the flow entry. At block 1206, an export policy is identified using the context-bitmap. At block 1208, information related to the flow is exported to a collector according to the export policy.

Figure 13:
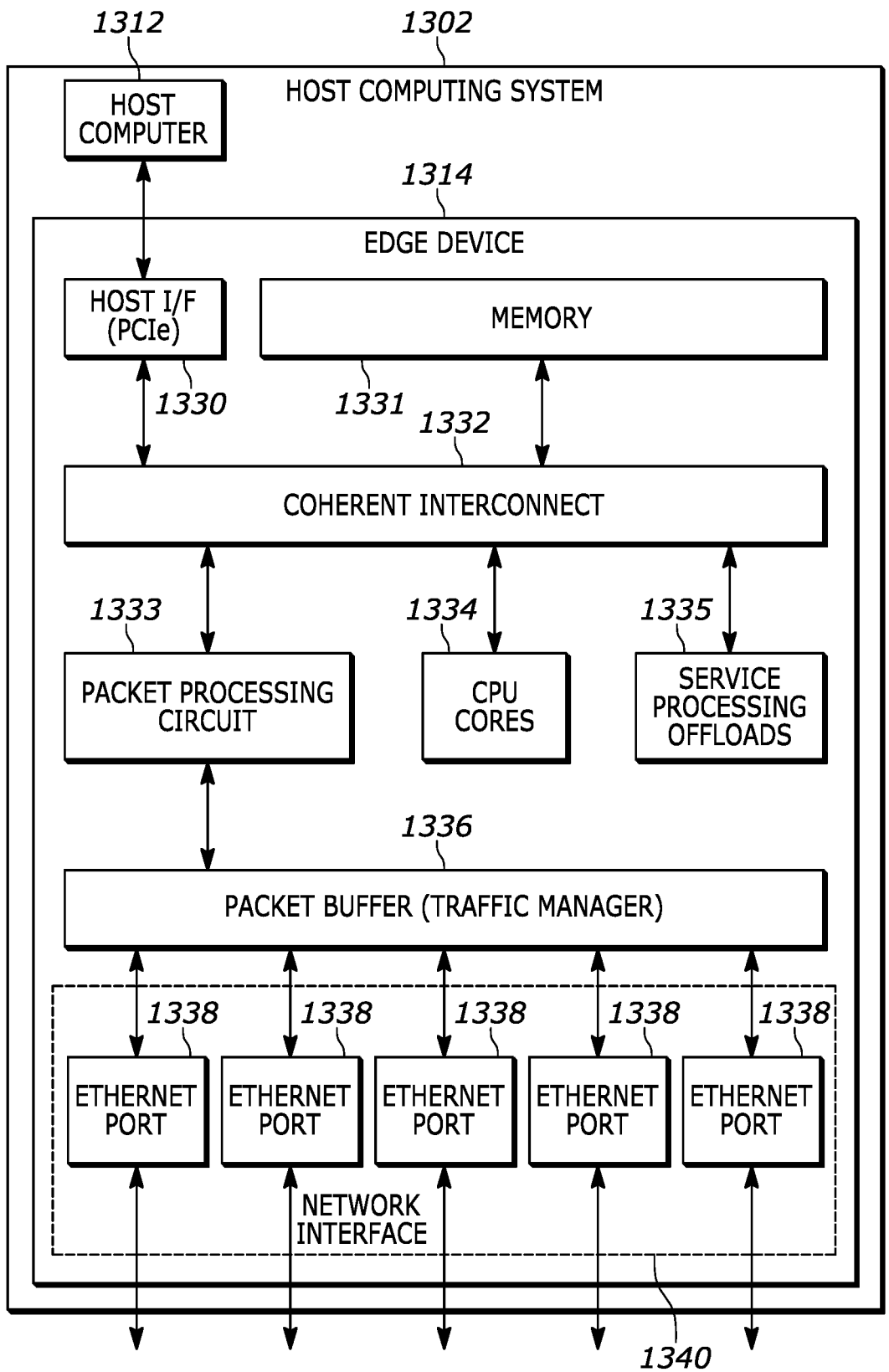
FIG. 13 depicts an example embodiment of an edge device that is configured to implement context-directed export as described herein.

In an embodiment, an IPFIX exporter as described above with reference to FIGS. 6-12 is implemented within an edge device, such as a NIC or "SmartNIC." FIG. 13 depicts an example embodiment of an edge device 1314 that is configured to implement context-directed export as described herein. The edge device is shown relative to a host computer 1312, in which the edge device and host computer form a host computing system 1302. In the embodiment of FIG. 13, the edge device is a NIC (also referred to as a "SmartNIC") that is configured to operate within the host computing system in which the host computer provides storage and/or compute resources. In other embodiments, the edge device may be single IC device, such as packet processor IC device, in which case the edge device may not include certain elements such as physical layer (PHY) elements (e.g., PHY transmitters/receivers and port connectors), additional memory, power management etc., which are typically part of a NIC. In another embodiment, the edge device can be a network node or switch, separated from the host, but directly (e.g., via a ToR switch) or indirectly (e.g., via some other switch or router in the network in the vicinity of the host) attached to the host through a network interface (e.g., an Ethernet interface) and the network.

In the example of FIG. 13, the edge device 1314 includes a host interface 1330 and a network interface 1340 along with a memory 1331, a coherent interconnect 1332, a packet processing circuit 1333, CPU cores 1334, service processing offloads 1335, and a packet buffer 1336. Although an example architecture of the edge device is described with reference to FIG. 13, other architectures of the edge device are possible.

In an embodiment, the host interface 1330 of the edge device 1314 is a PCIe interface that provides a high speed connection to the host computer 1312 and the network interface 1340 includes multiple ports, such as Ethernet ports 1338, that enable the edge device to communicate with other computing systems via network connections. In an embodiment in which the edge device is a NIC, the PCIe interface may include a PCIe port with a physical layer (PHY) interface and connector, and the Ethernet ports may include physical layer Ethernet ports and connectors, which may be, for example, optical PHY ports and/or twisted-pair PHY ports. In an embodiment in which the edge device is a single IC device, the host interface may include pins on the IC device that correspond to a PCIe physical interface and the network interface may include pins on the IC device that correspond to MAC level Ethernet communications.

The memory 1331 of the edge device 1314 can include memory for running Linux or some other operating system, memory for storing data structures such as the flow cache, statistics, and other analytics, and memory for providing buffering resources for advanced features including TCP termination and proxy, deep packet inspection, and storage offloads. The memory may include a high bandwidth module (HBM) that may support, for example, 4 GB capacity, 8 GB capacity, or some other capacity depending on package and HBM. Memory transactions in the edge device, including host memory, on board memory, and registers may be connected via the coherent interconnect 1332. In one non-limiting example, the coherent interconnect can be provided by a network on a chip (NOC) "IP core". Semiconductor chip designers may license and use prequalified IP cores within their designs. Prequalified IP cores may be available from third parties for inclusion in IC devices produced using certain semiconductor fabrication processes.

In an embodiment, the packet processing circuit 1333 implements a programmable packet processing pipeline that is programmable using a domain-specific language. For example, the concept of a domain-specific language for programming protocol-independent packet processors, known simply as "P4," has developed as a way to provide some flexibility at the data plane of an edge device. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," and the "P4 language") is designed to be implementable on a large variety of targets including programmable NICs, software switches, hardware switches, FPGAs, and ASICs. As described in the P4 specification, the primary abstractions provided by the P4 language relate to header types, parsers, tables, actions, match-action units, control flow, extern objects, user-defined metadata, and intrinsic metadata. The packet processing pipeline in the edge device may include an arbiter, a parser, a match-action pipeline, a deparser, and a demux/queue that constitute a P4 programmable NIC, a P4 programmable packet processor IC device, or some other architecture. The arbiter can act as an ingress unit receiving packets from RX-MACs and can also receive packets from a control plane via a control plane packet input. The arbiter can also receive packets that are recirculated to it by the demux/queue. The demux/queue can act as an egress unit and can also be configured to send packets to a drop port (the packets thereby disappear), to the arbiter via recirculation, and to the control plane via an output CPU port or via the coherent interconnect 1332. The control plane is often referred to as a CPU (central processing unit) although, in practice, control planes often executes on multiple CPU cores and other elements. The arbiter and the demux/queue can be configured through the domain-specific language (e.g., P4).

In an embodiment, the CPU cores 1334 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

The service processing offloads 1335 are specialized hardware modules purposely optimized to handle specific tasks at wire speed, such as cryptographic functions, compression/decompression, etc.

The packet buffer 1336 can act as a central on-chip packet switch that delivers packets from the network interfaces 1340 to packet processing elements of the edge device 1314 and vice-versa.

In an embodiment, operations described above with reference to FIGS. 6-13 are implemented in the packet processing circuit 1333 and the flow cache is held in the memory 1331. In other embodiments, the operations described above with reference to FIGS. 6-13 are implemented by the CPU cores 1334 or a combination of the packet processing circuit and the CPU cores.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for exporting network information from an exporter to a collector, the method comprising:
    updating a non-key field of a flow entry in a flow cache that corresponds to a flow;
    setting a field in a context-bitmap of the flow entry in response to updating the non-key field of the flow entry; and
    identifying an export policy using the context-bitmap; and
    exporting information related to the flow to a collector according to the export policy.

2. The method of claim 1, wherein exporting information related to the flow to a collector according to the export policy involves exporting information according to the Internet Protocol Flow Information eXport (IPFIX) protocol.

3. The method of claim 1, wherein the context-bitmap includes a set of context-specific bits.

4. The method of claim 1, wherein the context-bitmap includes a set of context-specific bits, including a short-lived context bit and a long-lived context bit.

5. The method of claim 1, wherein the context-bitmap includes a set of context-specific bits, including a dormant context bit and an active context bit.

6. The method of claim 1, wherein the context-bitmap includes a set of context-specific bits, including a security bit, a performance bit, a latency bit, an error bit, and a raw statistics bit.

7. The method of claim 1, wherein the context-bitmap includes a set of context-specific bits, including TCP context bits, UDP context bits, and ICMP context bits.

8. The method of claim 1, wherein the context-bitmap includes a set of context-specific bits, including a short-lived context bit, a long-lived context bit, a dormant context bit, an active context bit, a security bit, a performance bit, a latency bit, an error bit, and a raw statistics bit.

9. The method of claim 1, wherein the context-bitmap includes a set of context-specific bits, including a short-lived context bit, a long-lived context bit, a dormant context bit, an active context bit, TCP context bits, UDP context bits, and ICMP context bits.

10. The method of claim 1, wherein identifying an export policy using the context-bitmap involves using the context-bitmap to search an export policy lookup table that maps context-bitmap values to export policies.

11. The method of claim 1, wherein identifying an export policy using the context-bitmap involves using the context-bitmap to search an export policy lookup table that maps context-bitmap values to export policy actions and export policy parameters, wherein the export policy parameters include pointers to a collector template table.

12. The method of claim 11, further comprising identifying a collector and an export template using a pointer from the export policy lookup table.

13. The method of claim 1, wherein the non-key field in the flow cache holds information related to security of the flow and a bit in the context-bitmap includes a security context bit that is set in response to a value of the non-key field.

14. The method of claim 1, wherein the non-key field in the flow cache holds information related to performance of the flow and a bit in the context-bitmap includes a performance context bit that is set in response to a value of the non-key field.

15. The method of claim 1, wherein the non-key field in the flow cache holds information related to latency of the flow and a bit in the context-bitmap includes a latency context bit that is set in response to a value of the non-key field.

16. The method of claim 1, wherein the non-key field in the flow cache holds information related to an error of the flow and a bit in the context-bitmap includes an error context bit that is set in response to a value of the non-key field.

17. The method of claim 1, wherein updating a non-key field of a flow entry in a flow cache involves parsing a packet to identify a key field and using the key field to locate a flow entry in the flow cache.

18. A method for exporting network information from an exporter to a collector, the method comprising:
   updating a non-key field of a flow entry in a flow cache that corresponds to a flow;
   setting a field in a context-bitmap of the flow entry in response to updating the non-key field of the flow entry; and
   identifying an export policy using the context-bitmap; and
   exporting information related to the flow to a collector according to the export policy, wherein exporting information related to the flow to a collector according to the export policy involves exporting information according to the Internet Protocol Flow Information eXport (IPFIX) protocol;
   wherein the non-key field in the flow cache holds information related to the flow and a bit in the context-bitmap includes a context bit that is set in response to a value of the non-key field.

19. A system for exporting network information from an exporter to a collector, the system comprising:
   a processor; and
   a computer readable medium that stored instructions, which when executed by the processor, implement:
   updating a non-key field of a flow entry in a flow cache that corresponds to a flow;
   setting a field in a context-bitmap of the flow entry in response to updating the non-key field of the flow entry;
   identifying an export policy using the context-bitmap; and
   exporting information related to the flow to a collector according to the export policy.

* * * * *